(12) United States Patent
Tsutsumi et al.

(10) Patent No.: US 10,166,953 B2
(45) Date of Patent: Jan. 1, 2019

(54) VEHICLE SHIFT CONTROL SYSTEM

(75) Inventors: Takahiko Tsutsumi, Toyota (JP); Keisuke Sekiya, Toyota (JP); Koki Ueno, Toyota (JP); Ichiro Kitaori, Nagoya (JP); Toshinari Suzuki, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1100 days.

(21) Appl. No.: 13/510,967

(22) PCT Filed: Nov. 5, 2010

(86) PCT No.: PCT/IB2010/002821
§ 371 (c)(1),
(2), (4) Date: May 21, 2012

(87) PCT Pub. No.: WO2011/064634
PCT Pub. Date: Jun. 3, 2011

(65) Prior Publication Data
US 2012/0252628 A1 Oct. 4, 2012

(30) Foreign Application Priority Data
Nov. 24, 2009 (JP) .................................. 2009-266862

(51) Int. Cl.
*B60T 1/00* (2006.01)
*B60L 11/14* (2006.01)
(Continued)

(52) U.S. Cl.
CPC ............... *B60T 1/005* (2013.01); *B60L 11/14* (2013.01); *B60L 11/1816* (2013.01);
(Continued)

(58) Field of Classification Search
CPC ............... Y10T 477/24; Y10T 477/343; Y10T 477/656; B60T 1/005; F16H 53/483;
(Continued)

(56) References Cited

U.S. PATENT DOCUMENTS 3,231,857 A * 1/1966 Miller ........................... 340/456
3,896,759 A * 7/1975 Ogura ................. B60R 16/0236
116/28.1

(Continued)

FOREIGN PATENT DOCUMENTS

DE 101 57 459 C1 5/2003
EP 0 814 287 A 12/1997
(Continued)

OTHER PUBLICATIONS

"https://english.stackexchange.com/questions/185368/it-is-to-be-discussed-what-is-the-infinitive-doing-in-this-sentence" (Year: 2018).*

(Continued)

*Primary Examiner* — Sherry L Estremsky
(74) *Attorney, Agent, or Firm* — Finnegan, Henderson, Farabow, Garrett & Dunner, LLP

(57) ABSTRACT

When a P lock state is set on the basis of a predetermined request signal for setting the P lock state, a P position indicator lamp (62) is turned on or off on the basis of the status of power supplied to the vehicle (10). For example, when the P lock state is set, the P position indicator lamp (62) is turned off when the power status is an ALL-OFF status where a combination meter (56), or the like, is not turned on or is raised to an ACC-ON status; whereas, when the P lock state is set, the P position indicator lamp (62) is turned on when the power status is an IG-ON status, when the power status is changed from the IG-ON status during vehicle driving to the ACC-ON status, or within a predeter- (Continued)

mined period of time from when the power status is changed from the IG-ON status to the ALL-OFF status.

8 Claims, 8 Drawing Sheets

(51) Int. Cl.
    *F16H 63/48*     (2006.01)
    *B60L 11/18*     (2006.01)
    *F16H 63/42*     (2006.01)
    *F16H 59/74*     (2006.01)

(52) U.S. Cl.
    CPC ........ *F16H 63/483* (2013.01); *B60L 2220/18* (2013.01); *B60L 2250/16* (2013.01); *F16H 63/42* (2013.01); *F16H 2059/746* (2013.01); *Y02T 10/70* (2013.01); *Y02T 10/7005* (2013.01); *Y02T 10/7072* (2013.01); *Y02T 10/7077* (2013.01); *Y02T 90/14* (2013.01); *Y10T 477/343* (2015.01); *Y10T 477/656* (2015.01)

(58) Field of Classification Search
    CPC .. F16H 63/483; F16H 2059/746; F16H 63/42; B60L 2250/16; B60L 11/14; B60L 11/1816; B60L 2220/18; B60K 37/00–37/06; Y02T 10/70; Y02T 10/7005; Y02T 10/7072; Y02T 10/7077; Y02T 90/14
    USPC ................................ 340/453, 456; 116/28.1
    See application file for complete search history.

(56) References Cited

U.S. PATENT DOCUMENTS

| | | | | |
|---|---|---|---|---|
| 4,137,864 | A | * | 2/1979 | Lauper ........................ 116/28.1 |
| 5,014,038 | A | | 5/1991 | Leigh-Monstevens et al. |
| 5,696,483 | A | * | 12/1997 | Khalid et al. ................. 340/456 |
| 5,764,139 | A | * | 6/1998 | Nojima .................. B60K 35/00 340/438 |
| 5,954,179 | A | * | 9/1999 | Osborn ................... B60T 1/005 192/219.5 |
| 6,119,060 | A | * | 9/2000 | Takayama .............. B60K 35/00 307/9.1 |
| 6,859,687 | B2 | * | 2/2005 | Obradovich et al. ............. 701/1 |
| 2004/0200301 | A1 | | 10/2004 | Amamiya et al. |
| 2006/0017552 | A1 | * | 1/2006 | Andreasen et al. .......... 340/438 |

FOREIGN PATENT DOCUMENTS

| | | |
|---|---|---|
| JP | 2-18141 | 1/1990 |
| JP | 7-87607 | 3/1995 |
| JP | 7-228191 | 8/1995 |
| JP | 9-322313 | 12/1997 |
| JP | 2000-115901 | 4/2000 |
| JP | 2002-254954 | 9/2002 |
| JP | 2009-118658 | 5/2009 |
| WO | WO 91/10220 | 7/1991 |

OTHER PUBLICATIONS

International Search Report in International Application No. PCT/IB2010/002821; Dated Apr. 6, 2011.
Invitation to Pay Additional Fees in International Application No. PCT/IB2010/002821; Dated Feb. 23, 2011.
Written Opinion of the International Searching Authority in International Application No. PCT/IB2010/002821; Dated Apr. 6, 2011.
Applicant's Response to Written Opinion in International Application No. PCT/IB2010/002821 (Sep. 19, 2011.
International Preliminary Report on Patentability in International Application No. PCT/IB2010/002821; Completion Date: Dec. 28, 2011.

* cited by examiner

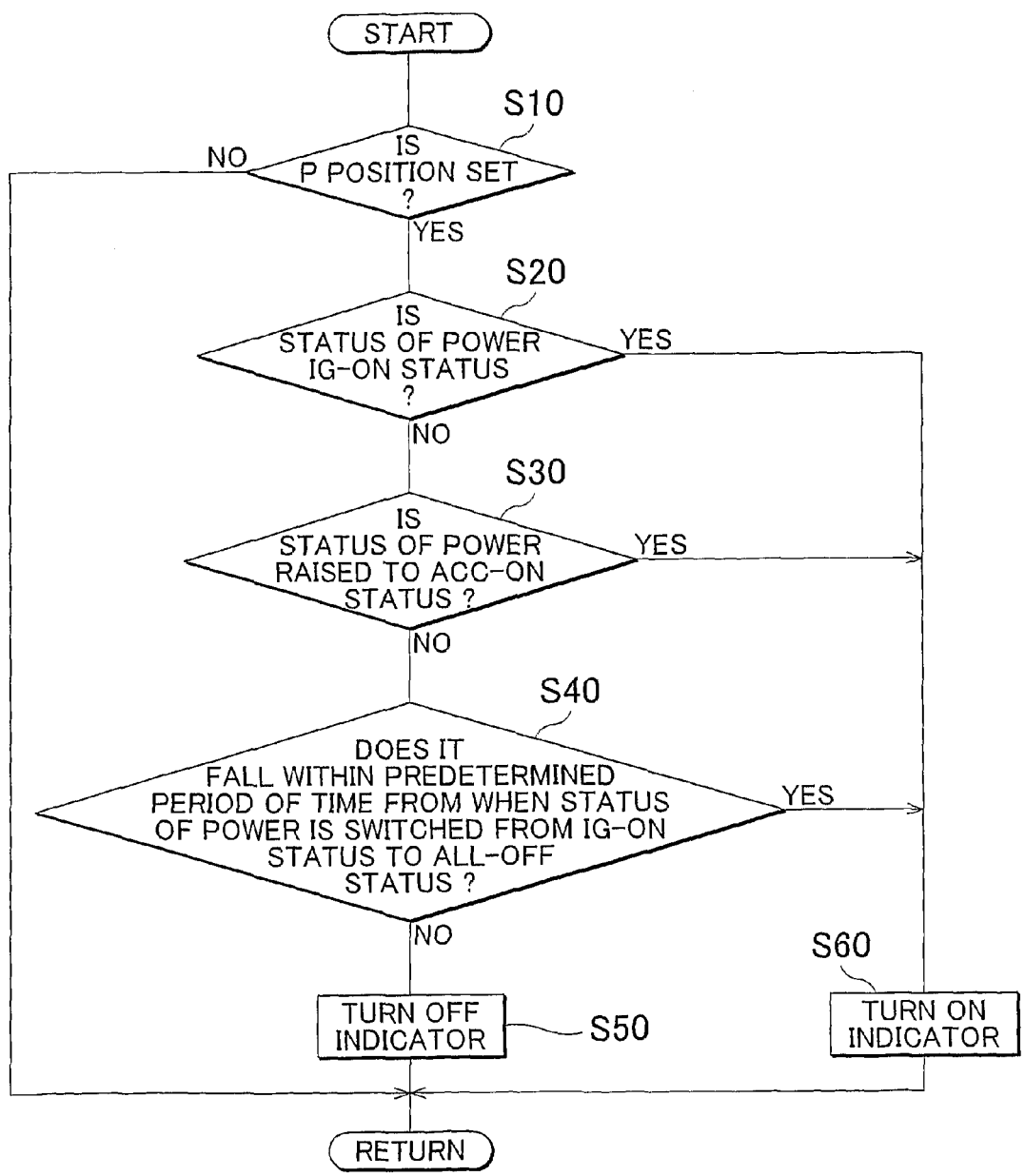

VEHICLE SHIFT CONTROL SYSTEM

CROSS-REFERENCE TO RELATED APPLICATIONS

This application is a national phase application of International Application No. PCT/IB2010/002821, filed Nov. 5, 2010, and claims the priority of Japanese Application No. 2009-266862, filed Nov. 24, 2009, the contents of both of which are incorporated herein by reference.

BACKGROUND OF THE INVENTION

1. Field of the Invention

The invention relates to a vehicle shift control system that includes a parking lock device that changes rotation teeth, rotating integrally with a wheel, between a locked state and a non-locked state; and a lock indicator lamp that turns on to indicate the locked state and, more particularly, to a shift-by-wire technology for electrically changing the shift position of a vehicle on the basis of a request signal for changing the rotation teeth between the locked state and the non-locked state.

2. Description of the Related Art

There is widely known a vehicle shift control system. The vehicle shift control system includes a parking lock device and a lock indicator lamp. The parking lock device changes rotation teeth, rotating integrally with a wheel, between a locked state where a lock tooth engages the rotation teeth and a non-locked state where the locked state is released. The lock indicator lamp turns on to indicate the locked state. The vehicle shift control system employs a so-called shift-by-wire (SBW) system that activates the parking lock device on the basis of a request signal to change the rotation teeth between the locked state and the non-locked state. By so doing, a shift position for vehicle driving is electrically changed. For example, there is a vehicle shift control system that uses a sensor, or the like, to detect an operating position of a shift operating device, such as a lever position of a shift lever, operated by a driver, and then electrically controls changing the shift position of the vehicle into a shift position corresponding to the shift operation on the basis of a position signal that indicates the detected lever position. Specifically, when the shift position determined on the basis of the position signal from the sensor is a driving position, the vehicle shift control system outputs a control signal to the vehicle to place the vehicle in a vehicle driving state according to the driving position. In addition, when the determined shift position is a parking position (P position), the vehicle shift control system actuates parking lock for inhibiting the rotation of the drive wheels in such a manner that a control signal is output to a parking lock device that mechanically inhibits the rotation of drive wheels to activate the parking lock device. Then, when the parking lock is set, the vehicle shift control system turns on the lock indicator lamp for indicating the locked state to the driver. For example, Japanese Patent Application Publication No. 2002-254954 (JP-A-2002-254954) describes a vehicle transmission control system and a shift operating member. The shift operating member includes an operating portion and a base. The operating portion has a plurality of light-emitting portions. The base supports the operating portion having a plurality of position indicators that indicate respective connected states of a transmission at portions corresponding to the light-emitting portions. The vehicle transmission control system employs a shift-by-wire system that turns on the position indicator and light-emitting portion corresponding to a current connected state of the transmission.

Here, there is a case where parking lock is actuated by a factor other than user's shift operation for setting the locked state. For example, when there occurs an external factor for charging a battery with electric power supplied from an external power supply to a vehicle as described in Japanese Patent Application Publication No. 7-87607 (JP-A-7-87607), it may be necessary to not only perform plug-in charging during a stop of the vehicle but also perform plug-in charging in a state where parking lock is set.

SUMMARY OF INVENTION

Incidentally, when it is necessary to set parking lock, it is necessary to, for example, start up a parking control computer (P-ECU) for activating a parking lock device to thereby execute a series of parking lock setting steps. Therefore, for example, even when the status of power supplied to the vehicle is a power off status for disabling the vehicle from running, the P-ECU is started up to set parking lock when an external factor, such as plug-in charging, occurs. When parking lock is set at the time of start-up of the P-ECU, the lock indicator lamp may turn on irrespective of the status of power supplied to the vehicle. That is, even when the status of power supplied to the vehicle is, for example, a power off status, the lock indicator lamp may possibly turn on. Such illumination of the lock indicator lamp based on parking lock without shift operation indicates not particularly useful information to a user. In a power off status, or the like, where a display device for indicating vehicle information related to vehicle driving is not turned on, the illumination may possibly dazzle the user. In addition, particularly, when the external factor is plug-in charging, there is a possibility that the charging efficiency of plug-in charging decreases because of illumination of the lock indicator lamp. In addition, different from the above problem, when the lock indicator lamp is turned off after parking lock is set to enter a power off status and then the P-ECU remains in operation, and, for example, when plug-in charging is performed, the set parking lock is maintained and it is not necessary to set parking lock again, so the lock indicator lamp may remain turned off. That is, there is a possibility that the lock indicator lamp is turned on or off at a timing at which an external factor occurs. By so doing, indication of a parking lock state differs even with the same operation, so a user may misunderstand it as a malfunction, or the like. Note that the above described problem is not publicly known.

The invention provides a vehicle shift control system that is able to appropriately turn on or off a lock indicator lamp when a locked state is set on the basis of a predetermined request signal for setting the locked state.

An aspect of the invention relates to a vehicle shift control system. The vehicle shift control system includes: a parking lock device that changes rotation teeth, rotating integrally with a drive wheel, between a locked state where a lock tooth engages the rotation teeth and a non-locked state where the locked state is released; and a lock indicator lamp that turns on to indicate the locked state, wherein the parking lock device is activated on the basis of a request signal to change the rotation teeth between the locked state and the non-locked state to thereby electrically change a shift position for vehicle driving. When the locked state is set on the basis of a predetermined request signal for setting the locked state, the lock indicator lamp is turned on or off on the basis of the status of power supplied to the vehicle.

By so doing, when the locked state is set on the basis of a predetermined request signal for setting the locked state, the lock indicator lamp is turned on or off on the basis of the status of power supplied to the vehicle. Therefore, for example, when the status of power supplied to the vehicle is a power off status, or the like, where the display device for indicating vehicle information related to vehicle driving is not turned on, the lock indicator lamp may be reliably turned off. This prevents indication of not particularly useful information, such as illumination of the lock indicator lamp at the time of parking lock without shift operation, to a user. Therefore, this prevents the illumination from dazzling the user in the power off status, or the like. In addition, for example, when the status of power supplied to the vehicle is a power on status, or the like, for turning on the display device for indicating vehicle information related to vehicle driving to enable the vehicle to run, the lock indicator lamp may be reliably turned on. By so doing, for example, even when not particularly useful information, such as illumination of the lock indicator lamp at the time of parking lock without shift operation, is indicated to the user, the display device for indicating the vehicle information may possibly remain turned on, so this prevents the illumination of the lock indicator lamp from dazzling the user. In addition, for example, the lock indicator lamp may also be turned off in the power off status, or the like, during plug-in charging, so this prevents a possible decrease in the charging efficiency of plug-in charging due to the illumination of the lock indicator lamp. Other than the above, the lock indicator lamp is uniformly turned on or off on the basis of the status of power supplied to the vehicle, so it is possible to uniformly indicate a vehicle state for user's same operation, and this prevents a possible misunderstanding of the user as a malfunction, or the like. In this way, when the locked state is set on the basis of the predetermined request signal for setting the locked state, it is possible to appropriately turn on or off the lock indicator lamp.

Here, when the status of power supplied to the vehicle is a power off status for disabling the vehicle from running, or when the status of power supplied to the vehicle is raised from the power off status to a partially power on status for disabling the vehicle from running but allowing operation of only part of functions of the vehicle while a display device for indicating vehicle information related to vehicle driving remains turned off, the lock indicator lamp may be turned off. For example, this prevents indication of not particularly useful information, such as illumination of the lock indicator lamp at the time of parking lock without shift operation, to the user, and also prevents the illumination from dazzling the user when the status of power is the power off status or when the status of power is raised to the partially power on status. In addition, for example, it is possible to turn off the lock indicator lamp when the status of power is the power off status or is raised to the partially power on status during plug-in charging, so this prevents a possible decrease in the charging efficiency of plug-in charging due to the illumination of the lock indicator lamp. Other than the above, the lock indicator lamp is uniformly turned off when the status of power is the power off status or is raised to the partially power on status, so this prevents a possible misunderstanding of the user as a malfunction, or the like.

In addition, the vehicle may include an electric motor as a driving force source and an electrical storage device that supplies stored electric power to the electric motor, during a stop of the vehicle, the electrical storage device may be chargeable with electric power supplied from an external power supply to the vehicle, and the predetermined request signal may be a request signal for setting the locked state, which is output when the charging is performed. By so doing, when the locked state is set at the time of charging the electrical storage device, the lock indicator lamp is turned on or off on the basis of the status of power supplied to the vehicle.

In addition, the lock indicator lamp may be turned on within a predetermined period of time from when the charging is started. This prevents the illumination of the lock indicator lamp from dazzling the user at the time of charging the electrical storage device. In addition, this prevents a decrease in the charging efficiency at the time of charging the electrical storage device. Other than the above, this prevents a possible misunderstanding of the user as a malfunction, or the like, at the time of charging the electrical storage device.

In addition, when the status of power supplied to the vehicle is a power on status for turning on a display device for indicating vehicle information related to vehicle driving to enable the vehicle to run, the lock indicator lamp may be turned on. By so doing, for example, the display device for indicating vehicle information may be turned on in the power on status, so this prevents the illumination of the lock indicator lamp from dazzling the user. Other than the above, the lock indicator lamp is uniformly turned on in the power on status, so this prevents a possible misunderstanding of the user as a malfunction, or the like.

In addition, the status of power supplied to the vehicle may be changeable to a power on status for turning on a display device for indicating vehicle information related to vehicle driving to enable the vehicle to run, (a) when the status of power supplied to the vehicle is changed from the power on status during vehicle driving to a partially power on status for disabling the vehicle from running but allowing operation of only part of functions of the vehicle while the display device remains turned off, or (b) within a predetermined period of time from when the status of power supplied to the vehicle is changed from the power on status to a power off status for disabling the vehicle from running, the lock indicator lamp may be turned on. The predetermined request signal in a case where the status of power supplied to the vehicle is changed from the power on status during vehicle driving to the partially power on status may be a request signal for setting the locked state, output on the basis of a position signal corresponding to an operating position of an operating device for changing the shift position, and the predetermined request signal in a case within a predetermined period of time from when the status of power supplied to the vehicle is changed from the power on status to the power off status may be a request signal for setting the locked state, output as the status of power supplied to the vehicle is changed from the power on status to the power off status. By so doing, when the status of power supplied to the vehicle is changed from the power on status during vehicle driving to the partially power on status, that is, even when the status of power supplied to the vehicle is the partially power on status for turning off the display device for indicating vehicle information related to vehicle driving, the lock indicator lamp is appropriately turned on when the locked state is set by user's operation. In addition, within a predetermined period of time from when the status of power supplied to the vehicle is changed from the power on status to the power off status, that is, even when the status of power supplied to the vehicle is the power off status for turning off the display device for indicating vehicle information related to vehicle driving, the lock indicator lamp is appropriately turned on for the predetermined period of time at the time of setting the locked state as the status of power supplied to the vehicle is changed from the power on status to the power off status. Other than the above, when the status of power is changed from the power on status during vehicle driving to the partially power on status or within a predetermined period of time from when the status of power is changed from the power on status to the power off status, the lock indicator lamp is uniformly turned on, so this prevents a possible misunderstanding of the user as a malfunction, or the like.

In addition, the vehicle may, for example, include a vehicle power transmission device in a power transmission path from a power source to the drive wheel. The power source is, for example, suitably an internal combustion engine, such as a gasoline engine and a diesel engine, that burns fuel to generate power; however, another prime mover, such as an electric motor, may be employed alone or in combination with the engine. That is, the vehicle is, for example, an engine driven vehicle that uses only an engine as a power source, an electric automobile that uses only an electric motor as a power source, a hybrid vehicle that uses both an engine and an electric motor as power sources, a vehicle that includes a prime mover other than an engine or an electric motor as a power source, a vehicle that includes three or more prime movers, or the like.

In addition, the vehicle power transmission device may be, for example, formed of a transmission alone, may be formed of a torque converter and a transmission having a plurality of speed ratios, or may be formed of a reduction mechanism or a differential mechanism in addition to the transmission, and the like. The transmission is, for example, various types of planetary gear automatic transmission, a synchromesh parallel two shaft transmission, a synchromesh parallel two shaft automatic transmission, a so-called belt-type continuously variable transmission, a so-called traction-type continuously variable transmission, an electrical continuously variable automatic transmission, an automatic transmission that is mounted on a so-called parallel-type hybrid vehicle, or the like. The various types of planetary gear automatic transmission have, for example, forward four speeds, forward five speeds, forward six speeds or more speeds, in which a plurality of gears (speeds) are alternatively achieved in such a manner that, in the electric automobile, a reduction gear, such as a planetary gear unit, coupled to the electric motor and rotating elements of a plurality of sets of planetary gear units are selectively coupled by engaging devices. The synchromesh two parallel shaft transmission includes a plurality of pairs of continuously engaged transmission gears between the two shafts and uses a synchronizer to alternatively place any one of those plurality of pairs of transmission gears in a power transmission state. The synchromesh two parallel shaft automatic transmission is able to automatically shift speeds by a synchronizer driven by a hydraulic actuator. The belt-type continuously variable transmission is configured so that a transmission belt that functions as a power transmission member is wound around a pair of variable pulleys of which the effective diameter is variable and then the speed ratio is steplessly varied. The traction-type continuously variable transmission includes a pair of cones rotated around a common axis and a plurality of rollers that are rotatable around a rotation center that intersects with the axis and that are held between the pair of cones, and is able to vary the speed ratio in such a manner that the intersection angle between the rotation center of each roller and the axis is varied. The electrical continuously variable automatic transmission includes: a differential mechanism formed of, for example, a planetary gear unit that distributes power from an engine between a first electric motor and an output shaft; and a second electric motor that is provided for the output shaft of the differential mechanism, and electrically varies the speed ratio in such a manner that the majority of power from the engine is mechanically transmitted to a drive wheel side by the differential action of the differential mechanism and the remaining portion of the power from the engine is electrically transmitted from the first electric motor to the second electric motor through an electrical path. The automatic transmission mounted on the parallel-type hybrid vehicle includes an electric motor that is able to transmit power to an engine shaft, an output shaft, or the like.

In addition, the rotation teeth of the parking lock device may be, for example, fixed to an output rotating member of the transmission; instead, it may be fixed to another rotating member among directly coupled components held in a power transmission state with respect to the drive wheel.

BRIEF DESCRIPTION OF DRAWINGS

The features, advantages, and technical and industrial significance of this invention will be described below with reference to the accompanying drawings, in which like numerals denote like elements, and wherein:

FIG. 1 is a view that illustrates the schematic configuration of a power transmission path that constitutes a vehicle to which an embodiment of the invention is applied and is a block diagram that illustrates a relevant portion of a control system provided for the vehicle in order to control a parking lock device, or the like;

FIG. 11 is a flowchart that illustrates a relevant portion of control operation of the electronic control unit, that is, control operation for appropriately turning on or off a P position indicator lamp.

DETAILED DESCRIPTION OF EMBODIMENTS

Figure 1:
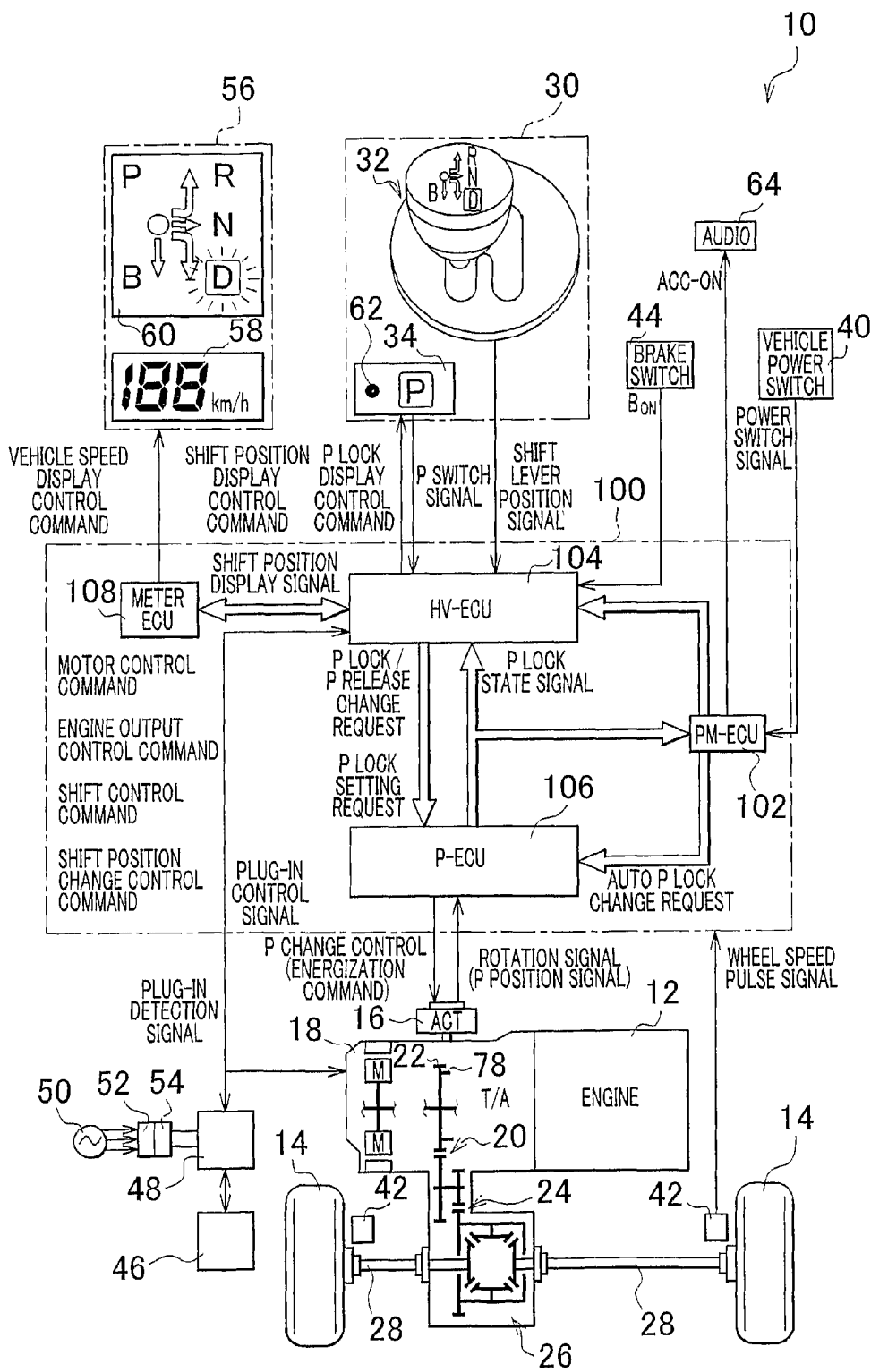

FIG. 1 is a view that illustrates the schematic configuration of a power transmission path from an engine 12 to drive wheels 14. The power transmission path constitutes a vehicle 10 to which an embodiment of the invention is applied. FIG. 1 is also a block diagram that illustrates a relevant portion of a control system provided for the vehicle 10 in order to control a parking lock device 16, and the like. As shown in FIG. 1, the vehicle 10 includes the parking lock device 16, a transmission 18, a shift operating device 30, and the like, and employs a shift-by-wire (SBW) system that electrically changes a shift position, that is, a shift position (shift range) of the transmission 18, for vehicle driving. In addition, the transmission 18 is, for example, suitably used for a front-engine rear-drive (FF) vehicle in which the transmission 18 is transversely arranged in the vehicle 10. Power of the engine 12 is transmitted from an output gear 22 to the pair of drive wheels 14 via a counter gear pair 20, a final gear pair 24, a differential gear 26, a pair of drive shafts (D/Ss) 28, and the like, sequentially. The engine 12 is an internal combustion engine as a driving force source for propelling the vehicle. The output gear 22 serves as an output rotating member of the transmission 18 and constitutes one of the counter gear pair 20. The counter gear pair 20, the final gear pair 24, the differential gear 26 and the pair of drive shafts 28 serve as a power transmission device. These transmission 18, counter gear pair 20, final gear pair 24, differential gear 26, and the like, constitute a transaxle (T/A). Note that, in the following description, an electronic control unit according to an embodiment of the invention is applied to a hybrid vehicle equipped with the engine 12 and an electric motor M as driving force sources; however, the vehicle to which the electronic control unit according to the embodiment of the invention is applied may be a vehicle of any type, such as an ordinary engine vehicle, a hybrid vehicle and an electric vehicle.

In addition, the vehicle 10 is equipped with an electronic control unit 100 that includes a vehicle shift control system for controlling the operation state, or the like, of the parking lock device 16. The electronic control unit 100 is configured to include a so-called microcomputer that has, for example, a CPU, a RAM, a ROM, an input/outer interface, and the like. The CPU utilizes the temporary storage function of the RAM while carrying out signal processing in accordance with a program stored in the ROM beforehand to thereby execute hybrid drive control, such as output control over the engine 12 and drive control over the electric motor M, gear shift control over the transmission 18, change control over the shift position of the transmission 18 using the shift-by-wire system, change control over the operation state of the parking lock device 16, and the like.

The electronic control unit 100 is, for example, supplied with shift lever position signals, corresponding to an operating position $P_{SH}$, from a shift sensor 36 and a select sensor 38 (see FIG. 2), a P switch signal that indicates switch operation to a P switch 34 for changing the shift position of the transmission 18 from a non-P position, other than a parking position (P position), to the P position through user's operation, a P position signal that indicates the operation state of a P lock in the parking lock device 16, a power switch signal that indicates switch operation to a vehicle power switch 40 for changing the status of power supplied to the vehicle 10 through user's operation, a wheel speed pulse signal, that corresponds to a vehicle speed V and that indicates the rotational speed $N_W$ of each wheel (drive wheels 14 and driven wheels) from each wheel speed sensor 42 as a rotational speed sensor, a brake operation signal that indicates a brake on state $B_{ON}$, indicating that a foot brake pedal (not shown) is operated, from a brake switch 44, a signal that indicates a charging current or discharging current $I_{CD}$ of an electrical storage device 46, a signal that indicates a voltage $V_{BAT}$ of the electrical storage device 46, a signal that indicates the state of charge (charged capacity) SOC of the electrical storage device 46, a plug-in detection signal that indicates that a connector 52 at the side of a commercial power supply 50 is connected to a connector 54 at the side of the vehicle 10 (inverter 48), and the like. The shift sensor 36 and the select sensor 38 are position sensors for detecting the operating position $P_{SH}$ of the shift lever 32. The parking lock device 16 is used for changing the shift position of the transmission 18 between the P position and the non-P position by activating or releasing parking lock (P lock). The brake switch 44 is used for detecting the operation of a service brake.

In addition, the electronic control unit 100, for example, outputs a hybrid control command signal, such as an engine output control command signal for output control over the engine 12, a motor control command signal for drive control over the electric motor M in the transmission 18 and a shift control command signal for gear shift control over the transmission 18, a shift position change control command signal for changing the shift position of the transmission 18, a vehicle speed display control command signal that activates a speedometer 58 provided in a known combination meter 56 as a display device for indicating vehicle information related to vehicle driving to the user to thereby display a current vehicle speed V, a shift position display control command signal that activates a shift position indicator (shift position display device) 60 provided in the combination meter 56 to thereby display the status of the shift position in the transmission 18, a parking lock display control command signal (P lock display control command signal) that activates a P position indicator lamp 62 as a lock indicator lamp to turn on for indicating that P lock is in operation (parking lock state, P lock state), that is, the shift position is the P position, to thereby indicate the P lock state, a P switch control command signal for change control over the parking lock device 16, and the like. Note that the P position indicator lamp 62 is activated irrespective of whether the combination meter 56 is activated (turned on or off), and is, for example, provided for the P switch 34.

Specifically, the electronic control unit 100 includes a power supply control computer (hereinafter, referred to as "PM-ECU") 102, a hybrid control computer (hereinafter, referred to as "HV-ECU") 104, a parking control computer (hereinafter, referred to as "P-ECU") 106, a meter control computer (hereinafter, referred to as "meter ECU") 108, and the like.

The PM-ECU 102, for example, changes the status of power supplied to the vehicle 10 on the basis of a power switch signal from the vehicle power switch 40 operated by the user. Here, in the present embodiment, the status of power supplied to the vehicle 10 may be, for example, changed to any one of a power off status (ALL-OFF status, IG/ACC-OFF status) for disabling the vehicle from running, a partially power on status for disabling the vehicle from driving but allowing operation of only part of the functions of the vehicle 10 while the combination meter 56 remains turned off and a power on status (IG-ON status) for turning on the combination meter 56 and enabling the vehicle to run. Allowing operation of only part of the functions of the vehicle 10 is to supply current for allowing the operation of, for example, a navigation system and audio 64, to supply current to a battery power extraction socket (not shown), or the like. Note that the IG-ON status is, for example, a status where vehicle driving may be controlled by the hybrid control command signal related to vehicle driving, and is a drivable status (READY-ON status) where the vehicle 10 can start and run when an accelerator is depressed; however, when it is not specifically distinguished, the IG-ON status includes a status where functions other than vehicle driving control through the hybrid control command signal may be controlled (for example, a status where shift position change control over the transmission 18 may be performed, or the like), the engine 12 will not be started up and the electric motor M cannot be driven, that is, a status where the vehicle 10 cannot start and run even when the accelerator is depressed.

For example, at the P position, as the PM-ECU 102 detects an input of the power switch signal in the brake on state $B_{ON}$, the PM-ECU 102 switches the status of power supplied to the vehicle 10 from any status to the IG-ON status (READY-ON status only). In addition, at the P position, as the PM-ECU 102 detects an input of the power switch signal when the vehicle speed V is lower than a predetermined stop vehicle speed V' in the IG-ON status, the PM-ECU 102 changes the status of power supplied to the vehicle 10 to the ALL-OFF status. In addition, at the P position, as the PM-ECU 102 detects an input of the power switch signal in a state other than the brake on state $B_{ON}$, the PM-ECU 102 changes the status of power supplied to the vehicle 10 in order of the ALL-OFF status, the ACC-ON status, the IG-ON status (not including the READY-ON status), the ALL-OFF status, . . . , each time the PM-ECU 102 detects an input of the power switch signal. In addition, at the non-P position, as the PM-ECU 102 detects an input of the power switch signal in the ACC-ON status or the IG-ON status (not including the READY-ON status) in the brake on state $B_{ON}$, the PM-ECU 102 changes the status of power supplied to the vehicle 10 to the IG-ON status (READY-ON status only). In addition, at the non-P position, as the PM-ECU 102 detects an input of the power switch signal when the vehicle speed V is lower than the predetermined stop vehicle speed V' in the IG-ON status, the PM-ECU 102 outputs, to the P-ECU 106, an auto P lock change request signal for activating the parking lock device 16 to automatically change the shift position to the P position, and changes the status of power supplied to the vehicle 10 to the ALL-OFF status after the P position is set (a series of these operations are termed "auto P operation"). In addition, at the non-P position, as the PM-ECU 102 detects an input of the power switch signal in the ACC-ON status but not in the brake on state $B_{ON}$, the PM-ECU 102 changes the status of power supplied to the vehicle 10 to the IG-ON status (not including the READY-ON status). The predetermined stop vehicle speed V is, for example, a vehicle stop determination speed that is empirically obtained in advance for determining that the vehicle is stopped. Note that the PM-ECU 102 cancels the operation of the vehicle power switch 40 during vehicle driving (that is, invalidates the power switch signal from the vehicle power switch 40); particularly, as the PM-ECU 102 continuously detects an input of the power switch signal for several seconds or longer (for example, 3 seconds or longer) during vehicle driving, the PM-ECU 102 changes the status of power supplied to the vehicle 10 from the IG-ON status to the ACC-ON status, and outputs, to the HV-ECU 104, a signal for changing the shift position into a neutral position (N position).

The HV-ECU 104, for example, comprehensively controls the operation of the transmission 18. For example, as the status of power supplied to the vehicle 10 is changed by the PM-ECU 102 to the IG-ON status (READY-ON status only), the HV-ECU 104 starts up a hybrid system for enabling the vehicle to run, and outputs a hybrid control command related to vehicle driving to the engine 12, the electric motor M and the transmission 18 to thereby control vehicle driving. In addition, the HV-ECU 104 outputs a shift position change control command to the transmission 18 on the basis of shift lever position signals, corresponding to the operating position $P_{SH}$, from the shift sensor 36 and the select sensor 38 to thereby change the shift position. At this time, when the shift position of the transmission 18 is the P position, the HV-ECU 104 outputs, to the P-ECU 106, a P release change request signal for changing the shift position of the transmission 18 from the P position to the non-P position on the basis of the shift lever position signal. In addition, the HV-ECU 104 outputs, to the P-ECU 106, a P lock change request signal for changing the shift position of the transmission 18 from the non-P position to the P position on the basis of the P switch signal from the P switch 34. In addition, the HV-ECU 104 outputs a shift position display signal for displaying the status of the shift position to the meter ECU 108. In addition, the HV-ECU 104 outputs, to the P switch 34, a parking lock display control command signal (P lock display control command signal) for displaying the P lock state (P position) on the basis of the P lock status signal indicating the P position from the P-ECU 106, and then turns on the P position indicator lamp 62 in the P switch 34 to indicate the P lock state.

Here, the electrical storage device 46 is a chargeable and dischargeable direct-current power supply, and is, for example, formed of a nickel metal hydride secondary battery or a lithium ion secondary battery. For example, during vehicle acceleration or during motor driving, stored electric power is supplied to the electric motor M via an inverter 48. In addition, at the time of regenerative braking during vehicle deceleration, electric power generated by the electric motor M is stored in the electrical storage device 46 via the inverter 48. Furthermore, during a stop of the vehicle 10, the electrical storage device 46 may be charged by electric power supplied from an external power supply, such as a commercial power supply 50 outside the vehicle, to the vehicle 10 (so-called plug-in charging). For example, the vehicle 10 includes the connector 54, which is a terminal for inputting electric power supplied from the commercial power supply 50. Then, as the connector 52 at the side of the commercial power supply 50 is connected to the connector 54, the voltage of the commercial power supply 50 is applied to the connector 54, and the electrical storage device 46 is charged with electric power from the commercial power supply 50 via the inverter 48. At this time, the HV-ECU 104 outputs a plug-in detection signal that indicates that the connector 52 at the side of the commercial power supply 50 is connected to the connector 54 at the side of the vehicle 10 and a plug-in control signal that controls plug-in charging on the basis of the state of charge SOC of the electrical storage device 46 to the inverter 48 to thereby, for example, monitor and control plug-in charging. Moreover, in order to perform plug-in charging at the P position (P lock state), the HV-ECU 104 outputs a P lock setting request signal for setting the P position to the P-ECU 106 before the HV-ECU 104 outputs the plug-in control signal to the inverter 48. Thus, the HV-ECU 104 is placed in a wake status where the function of, for example, detecting vehicle information, or the like, is activated even when the status of power supplied to the vehicle 10 is the ALL-OFF status or the ACC-ON status. In this way, the vehicle 10 according to the present embodiment is a so-called plug-in hybrid vehicle that is able to charge the electrical storage device 46 with electric power from the commercial power supply 50 outside the vehicle.

The P-ECU 106 controls the operation of the parking lock device 16 to activate or release parking lock in order to, for example, change the shift position between the P position and the non-P position on the basis of the auto P lock change request signal from the PM-ECU 102 or the P change request signal (P lock change request signal, P release change request signal) from the HV-ECU 104. In addition, the P-ECU 106 determines whether the shift position of the transmission 18 is the P position or the non-P position on the basis of the P position signal that indicates the operation state of parking lock from the parking lock device 16, and then outputs the determined result to the PM-ECU 102, the HV-ECU 104, and the like, as a P lock status signal.

In addition, when the status of power supplied to the vehicle 10 is changed from the ALL-OFF status or the ACC-ON status to the IG-ON status, the P-ECU 106 executes initial drive control in the parking lock device 16, and then executes control for respectively detecting a P wall position and a non-P wall position at which the P position signal and the non-P position signal may be appropriately obtained, as will be described later. In addition, the P-ECU 106 executes initial process of the P-ECU 106 itself before the P-ECU 106 executes a series of initial controls in the parking lock device 16 at the time when the status of power supplied to the vehicle 10 is changed from the ALL-OFF status or the ACC-ON status to the IG-ON status.

In addition, the P-ECU 106, for example, executes the series of initial controls in the parking lock device 16 on the basis of the P lock setting request signal from the HV-ECU 104, and controls the operation of the parking lock device 16 to activate parking lock to thereby set the P position (P lock state). Thus, the P-ECU 106, as well as the HV-ECU 104, is placed in a wake status where the function of, for example, detecting vehicle information, or the like, is activated even when the status of power supplied to the vehicle 10 is the ALL-OFF status or the ACC-ON status. Moreover, even when the status of power supplied to the vehicle 10 is the ALL-OFF status or the ACC-ON status, as the P-ECU 106 detects an input of the P lock setting request signal from the HV-ECU 104, the P-ECU 106 is placed in a start-up status where the series of initial controls in the parking lock device 16 may be executed. In this way, the procedure of setting the P lock state through the series of initial controls should be termed P lock state setting procedure. Note that, when the P-ECU 106 is once placed in a wake status, it is difficult to determine (ensure) the P lock state even when the parking lock device 16 is in the P lock state, so the series of initial controls are executed. Therefore, when the P-ECU 106 is originally started up and then the series of initial controls have been already completed, the P-ECU 106 does not necessarily execute the series of initial controls again even when the P-ECU 106 detects an input of the P lock setting request signal, and it is only necessary that the P-ECU 106 ensures (determines) the P lock state.

The meter ECU 108 outputs a vehicle speed display control command signal for displaying a current vehicle speed V to the speedometer 58 in the combination meter 56 to thereby display the current vehicle speed V. For example, the meter ECU 108 counts the rectangular waveform of a vehicle speed pulse signal based on the wheel speed pulse signal output from each wheel speed sensor 42 to thereby determine a meter display vehicle speed signal V. Then, the meter ECU 108 activates the speedometer 58 on the basis of the determined meter display vehicle speed signal V to turn on the corresponding segment to thereby display the current vehicle speed V. In addition, the meter ECU 108 outputs a shift position display control command signal for displaying the status of the shift position based on the shift position display signal output from the HV-ECU 104 to the shift position indicator 60 in the combination meter 56, and then displays the status of the current shift position on the shift position indicator 60. For example, the meter ECU 108 turns on an indicating position of the corresponding shift position on the shift position indicator 60.

Figure 2:
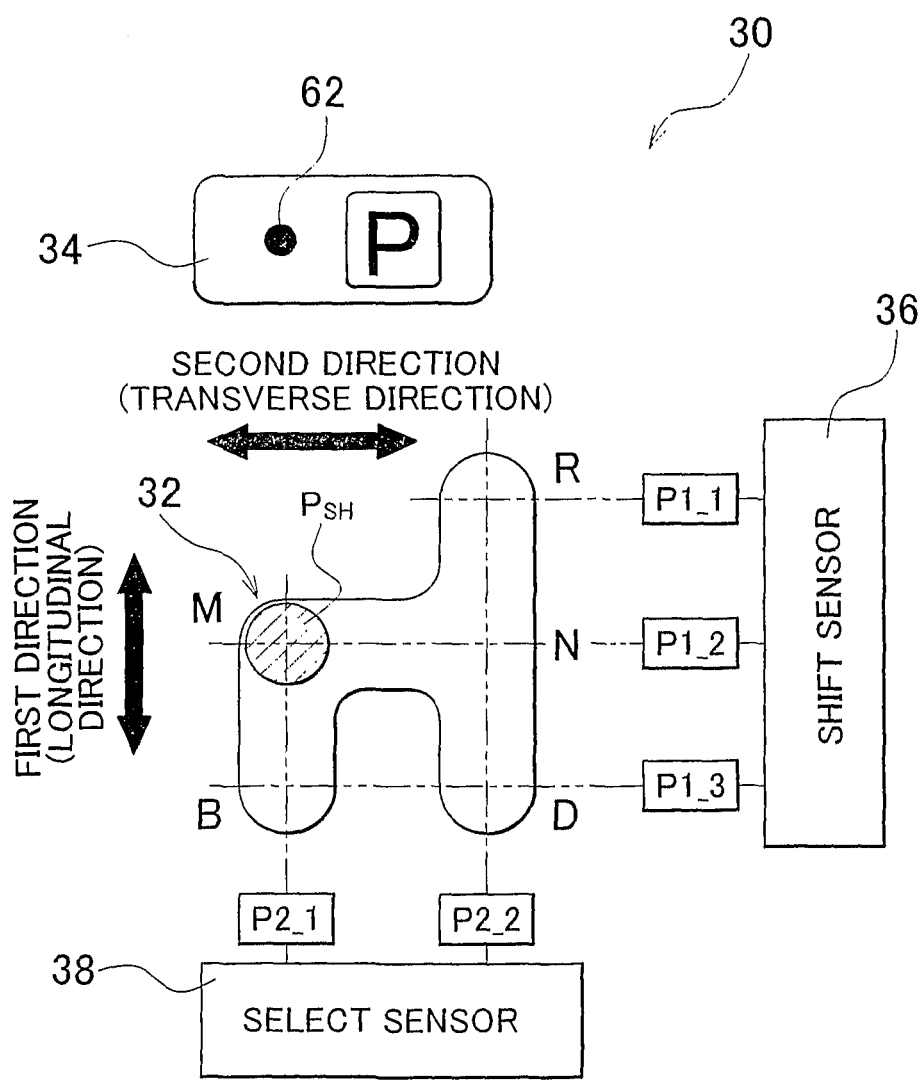
FIG. 2 is a view that shows an example of a shift operating device as a shifting device that changes a plurality of types of shift position through manual operation.

FIG. 2 is a view that shows an example of the shift operating device 30 as a shifting device (operating device) that changes a plurality of types of shift position in the transmission 18 through manual operation. The shift operating device 30 is, for example, arranged near a driver seat, and includes a shift lever 32 as a momentary operating member that is operated to a plurality of operating positions $P_{SH}$, that is, an automatic return operating member that automatically returns to an original position (initial position) when operating force is released. In addition, the shift operating device 30 according to the present embodiment has the P switch 34 as another switch near the shift lever 32. The P switch 34 serves as a momentary operating member for setting the shift position of the transmission 18 at the parking position (P position) to actuate parking lock.

As shown in FIG. 2, the shift lever 32 is configured to be operated to an R operating position, an N operating position, a D operating position, an M operating position and a B operating position. The R, N and D operating positions are three operating positions $P_{SH}$ arranged in the front-rear direction or vertical direction of the vehicle, that is, in the longitudinal direction. The M and B operating positions are arranged parallel to the above three positions $P_{SH}$. Shift lever position signals corresponding to the operating position $P_{SH}$ are output to the HV-ECU 104. In addition, the shift lever 32 is operable in the longitudinal direction among the R operating position, the N operating position and the D operating position, and is operable in the longitudinal direction between the M operating position and the B operating position, and, furthermore, is operable in the transverse direction of the vehicle perpendicular to the longitudinal direction between the N operating position and the B operating position.

The P switch 34 is, for example, a momentary push button switch, and outputs the P switch signal to the HV-ECU 104 each time the P switch 34 is depressed by the user. For example, as the P switch 34 is depressed when the shift position of the transmission 18 is the non-P position, when, for example, a predetermined condition that the vehicle speed V is lower than a P lock allowable vehicle speed Vp is satisfied, the shift position is changed to the P position by the P-ECU 106 on the basis of the P lock change request signal from the HV-ECU 104. The P position is a parking position at which the power transmission path in the transmission 18 is interrupted and parking lock that mechanically inhibits the rotation of the drive wheels 14 by the parking lock device 16 is actuated. In addition, the P switch 34 includes the built-in P position indicator lamp 62. When the P lock status signal from the P-ECU 106 indicates the P position, the P position indicator lamp 62 is turned on by the HV-ECU 104.

The M operating position of the shift operating device 30 is an initial position (home position) of the shift lever 32. Even when the shift operating device 30 is shifted to an operating position $P_{SH}$ (R, N, D or B operating position) other than the M operating position, when the driver releases the shift lever 32, that is, no external force is applied to the shift lever 32, the shift lever 32 returns to the M operating position by a mechanical mechanism, such as a spring. When the shift operating device 30 is shifted to each operating position $P_{SH}$, the HV-ECU 104 changes the shift position into a shift position corresponding to the operating position $P_{SH}$ after the shift operation on the basis of the shift lever position signal corresponding to the operating position $P_{SH}$, and then the status of the current operating position $P_{SH}$, that is, the status of the shift position of the transmission 18, is displayed on the shift position indicator 60.

When each shift position is described, the R position selected by shifting the shift lever 32 into the R operating position is a reverse driving position at which driving force that reverses the vehicle is transmitted to the drive wheels 14. In addition, the neutral position (N position) selected by shifting the shift lever 32 into the N operating position is a neutral position at which the power transmission path in the transmission 18 is interrupted. In addition, the D position selected by shifting the shift lever 32 into the D operating position is a forward driving position at which driving force that propels the vehicle is transmitted to the drive wheels 14. For example, when the shift position is the P position, and when the HV-ECU 104 determines that the shift lever 32 is shifted into a predetermined operating position $P_{SH}$ (specifically, R operating position, N operating position or D operating position) for releasing movement prevention (parking lock) of the vehicle on the basis of the shift lever position signal, the HV-ECU 104 outputs the P release change request signal for releasing parking lock to the P-ECU 106 when a predetermined condition, such as the brake on state $B_{ON}$, is satisfied. The P-ECU 106 outputs the P shift control command signal for releasing parking lock to the parking lock device 16 on the basis of the P release change request signal from the HV-ECU 104 to thereby release parking lock. Then, the HV-ECU 104 changes the shift position into a shift position corresponding to the shifted operating position $P_{SH}$.

In addition, the B position selected by shifting the shift lever 32 into the B operating position is a decelerating forward driving position (engine brake range) that, for example, uses regenerative braking for causing the electric motor M to generate regenerative torque at the D position to exert engine brake effect to thereby decelerate the rotation of the drive wheels 14. Thus, even when the shift lever 32 is shifted into the B operating position when the current shift position is a shift position other than the D position, the HV-ECU 104 invalidates the shift operation, and validates shift operation into the B operating position only when the current shift position is the D position. For example, even when the driver shifts the shift lever 32 into the B operating position when the shift position is the P position, the shift position remains at the P position.

In the shift operating device 30 according to the present embodiment, because the shift lever 32 is returned to the M operating position when no external force is applied to the shift lever 32, so the selected shift position cannot be recognized only by looking at the operating position $P_{SH}$ of the shift lever 32. Therefore, the shift position indicator 60 is provided at an easy-to-see position for the driver, and the selected shift position is displayed on the shift position indicator 60 including the case where the selected shift position is the P position.

In the present embodiment, a so-called shift-by-wire (SBW) system is employed, and the shift operating device 30 is shifted two-dimensionally in a first direction P1 that is the above described longitudinal direction and a second direction P2 that is a transverse direction that intersects with (in FIG. 2, perpendicular to) the first direction P1. Thus, in order to output the operating position $P_{SH}$ to the electronic control unit 100 as a signal detected by the position sensors, the shift sensor 36 and the select sensor 38 are provided. The shift sensor 36 serves as a first direction detecting unit that detects shift operation in the first direction P1. The select sensor 38 serves as a second direction detecting unit that detects shift operation in the second direction P2. The shift sensor 36 and the select sensor 38 each output a voltage as a detection signal (shift lever position signal) corresponding to the operating position $P_{SH}$ to the electronic control unit 100, and the electronic control unit 100 recognizes (determines) the operating position $P_{SH}$ on the basis of the detection signal voltage. That is, the first direction detecting unit (shift sensor 36) and the second direction detecting unit (select sensor 38) constitute an operating position detecting unit that detects the operating position $P_{SH}$ of the shift operating device 30 as a whole.

As an example of recognition of the operating position $P_{SH}$, a detection signal voltage $V_{SF}$ of the shift sensor 36 has a voltage level (for example, any one of voltages of a low range, a mid range and a high range) corresponding to a first direction first position P1_1 that indicates the R operating position, a first direction second position P1_2 that indicates the M operating position or the N operating position and a first direction third position P1_3 that indicates the B operating position or the D operating position. In addition, a detection signal voltage $V_{SL}$ of the select sensor 38 has a voltage level (for example, any one of voltages of a low range and a high range) corresponding to a second direction first position P2_1 that indicates the M operating position or the B operating position and a second direction second position P2_2 that indicates the R operating position, the N operating position or the D operating position. The HV-ECU 104 detects the detection signal voltages $V_{SF}$ and $V_{SL}$ that vary in this way to thereby recognize the operating position $P_{SH}$ (R, N, D, M or B operating position) through a combination of the voltage levels.

Figure 3:
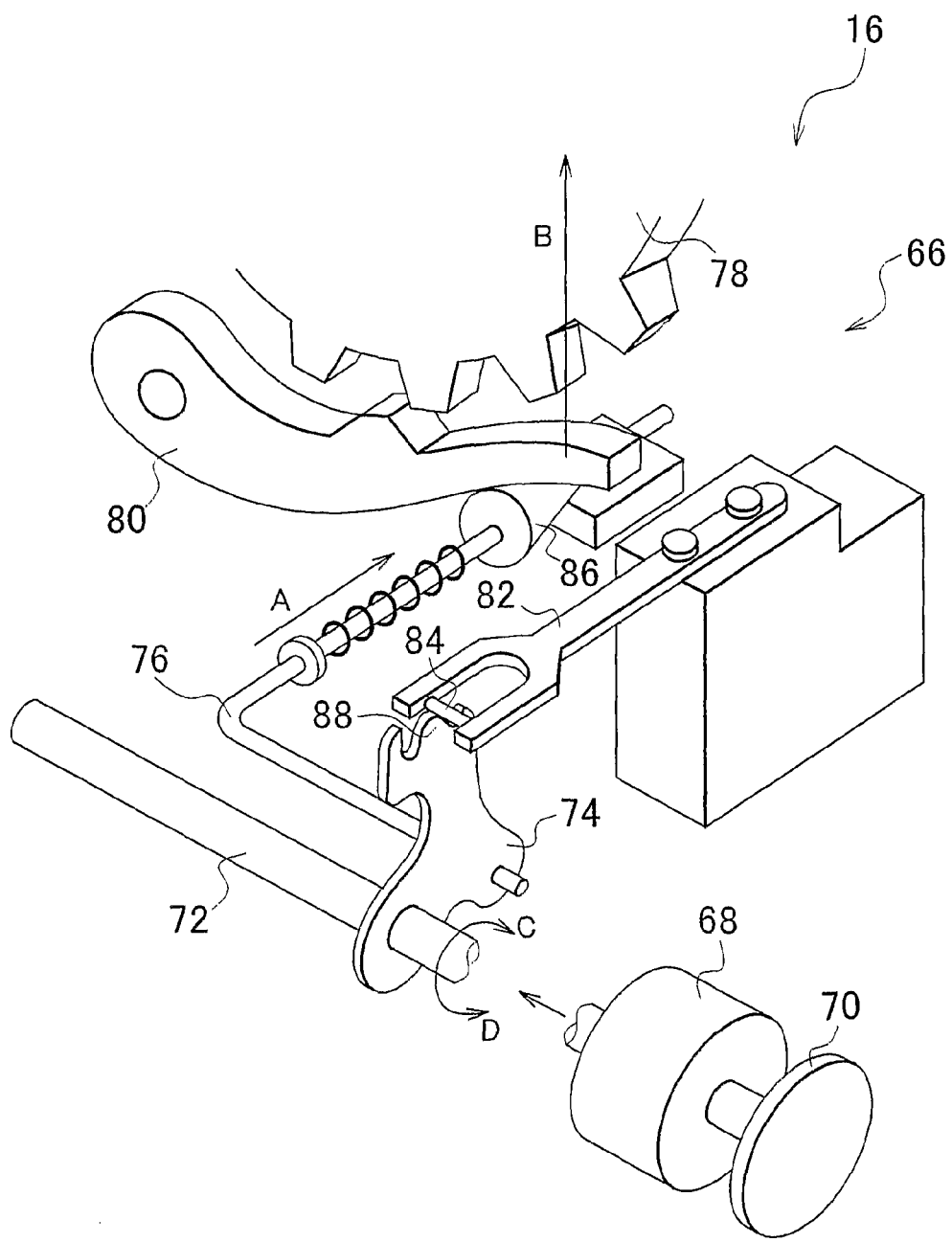
FIG. 3 is a view that illustrates the configuration of the parking lock device that mechanically inhibits the rotation of a drive wheel.

FIG. 3 is a view that illustrates the configuration of the parking lock device 16 that mechanically inhibits the rotation of the drive wheels 14. As shown in FIG. 3, the parking lock device 16 includes a P lock mechanism (parking lock mechanism) 66, a P lock drive motor (parking lock drive motor) 68, an encoder 70, and the like. The parking lock device 16 is an actuator that operates to prevent movement of the vehicle 10 on the basis of a control signal from the electronic control unit 100.

The P lock drive motor 68 is, for example, formed of a switched reluctance motor (SR motor), and receives a command (control signal) from the P-ECU 106 to drive the P lock mechanism 66 by the shift-by-wire system. The encoder 70 is, for example, a rotary encoder that outputs A-phase, B-phase and Z-phase signals. The encoder 70 integrally rotates with the P lock drive motor 68, detects the rotation condition of the SR motor and then supplies the P-ECU 106 with a signal that indicates the rotation condition, that is, a pulse signal for acquiring a count value (encoder count) corresponding to the amount of movement (rotation amount) of the P lock drive motor 68. The P-ECU 106 acquires the signal supplied from the encoder 70 to obtain the rotation condition of the SR motor, and controls current for driving the SR motor.

The P lock mechanism 66 includes a shaft 72, a detent plate 74, a rod 76, a parking gear 78, a parking lock pawl 80, a detent spring 82 and a roller 84. The shaft 72 is driven for rotation by the P lock drive motor 68. The detent plate 74 rotates with the rotation of the shaft 72. The rod 76 moves with the rotation of the detect plate 74. The parking gear 78 rotates in synchronization with the drive wheels 14. The parking lock pawl 80 is used to inhibit (lock) the rotation of the parking gear 78. The detent spring 82 restricts the rotation of the detent plate 74 to fix the shift position. The location of the parking gear 78 is not limited as long as the drive wheels 14 are locked when the parking gear 78 is locked. For example, the parking gear 78 is fixed concentrically with the output gear 22 of the transmission 18 (see FIG. 1).

The detent plate 74 is operably coupled to the drive shaft of the P lock drive motor 68 via the shaft 72. The detent plate 74 functions as a parking lock positioning member that is driven by the P lock drive motor 68 together with the rod 76, the detent spring 82, the roller 84, and the like, to change between a parking lock position corresponding to the P position and a non-parking lock position corresponding to the shift positions other than the P position (non-P position). The shaft 72, the detent plate 74, the rod 76, the detent spring 82 and the roller 84 serve as a parking lock changing mechanism.

FIG. 3 shows a state of the non-parking lock position, that is, a state where the shift position is the non-P position. In this state, because the parking lock pawl 80 is not locking the parking gear 78, the rotation of the drive wheels 14 is not inhibited by the P lock mechanism 66. From this state, as the shaft 72 is rotated in the arrow C direction indicated in FIG. 3 by the P lock drive motor 68, the rod 76 is pushed in the arrow A direction indicated in FIG. 3 via the detent plate 74, and then the parking lock pawl 80 is pushed up in the arrow B direction indicated in FIG. 3 by a taper member 86 provided at the distal end of the rod 76. With the rotation of the detent plate 74, the roller 84 of the detent spring 82 located at one of two roots provided at the top portion of the detent plate 74, that is, a non-parking lock position 90 (hereinafter, non-P position 90 (see FIG. 4)), passes over a crest 88 to the other root, that is, a parking lock position 92 (hereinafter, P position 92 (see FIG. 4)). The roller 84 is provided for the detent spring 82 so as to be rotatable about the axis thereof. When the detent plate 74 rotates and then the roller 84 reaches the P position 92, the parking lock pawl 80 is pushed up to a position at which the parking lock pawl 80 engages the parking gear 78. By so doing, the rotation of the drive wheels 14 that rotate in synchronization with the parking gear 78 is mechanically inhibited, and the shift position is changed into the P position. In the parking lock device 16, in order to reduce a load on the P lock mechanism 66, such as the detent plate 74, the detent spring 82 and the shaft 72, at the time of changing the shift position between the P position and the non-P position, the P-ECU 106, for example, controls the rotation amount of the P lock drive motor 68 so as to reduce an impact at the time when the roller 84 of the detent spring 82 passes over the crest 88 and then drops.

In this way, the parking lock device 16 changes the parking gear 78 between a locked state (P lock state) where the parking lock pawl 80 engages the parking gear 78 and a non-locked state (non-P lock state) where the locked state is released on the basis of driver's operation. The parking gear 78 serves as the rotary teeth rotating integrally with the drive wheels 14.

Figure 4:
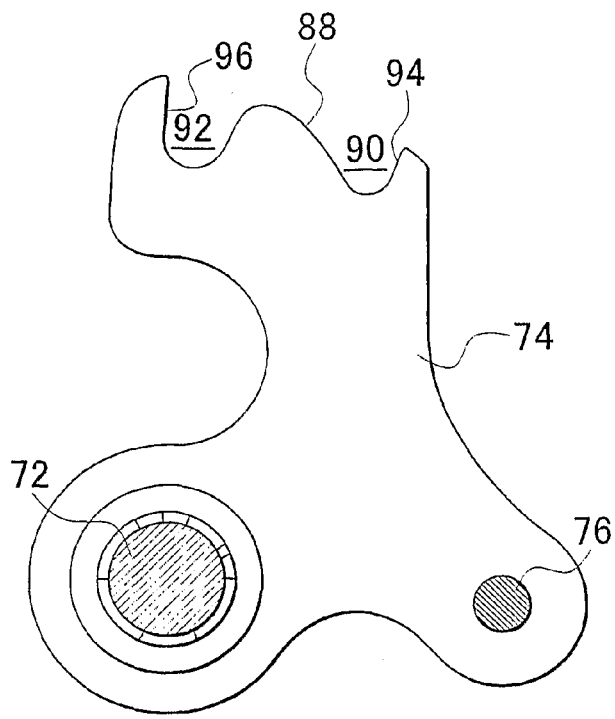
FIG. 4 is a view that illustrates the configuration of a detent plate.

FIG. 4 is a view that illustrates the configuration of the detent plate 74. In each of the roots, a surface located at a side away from the crest 88 is termed wall. That is, the wall is present at a location at which the roller 84 contacts the root when the roller 84 of the detent spring 82 passes over the crest 88 and then drops into the root in a state where the following control is not executed by the P-ECU 106. The wall at the P position 92 is termed "P wall", and the wall at the non-P position 90 is termed "non-P wall". When the roller 84 moves from the P position 92 to the non-P position 90, the P-ECU 106 controls the P lock drive motor 68 so that the non-P wall 94 does not collide with the roller 84. Specifically, the P-ECU 106 stops the rotation of the P lock drive motor 68 at a position before the non-P wall 94 collides with the roller 84. The above position is termed "non-P target rotation position". In addition, when the roller 84 moves from the non-P position 90 to the P position 92, the P-ECU 106 controls the P lock drive motor 68 so that the P wall 96 does not collide with the roller 84. Specifically, the P-ECU 106 stops the rotation of the P lock drive motor 68 at a position before the P wall 96 collides with the roller 84. The above position is termed "P target rotation position". Through control of the P lock drive motor 68 by the P-ECU 106, it is possible to significantly reduce a load on the P lock mechanism 66, such as the detent plate 74, the detent spring 82 and the shaft 72, at the time of changing the shift position. By reducing the load, it is possible to reduce the weight and cost of the P lock mechanism 66.

Figure 5:
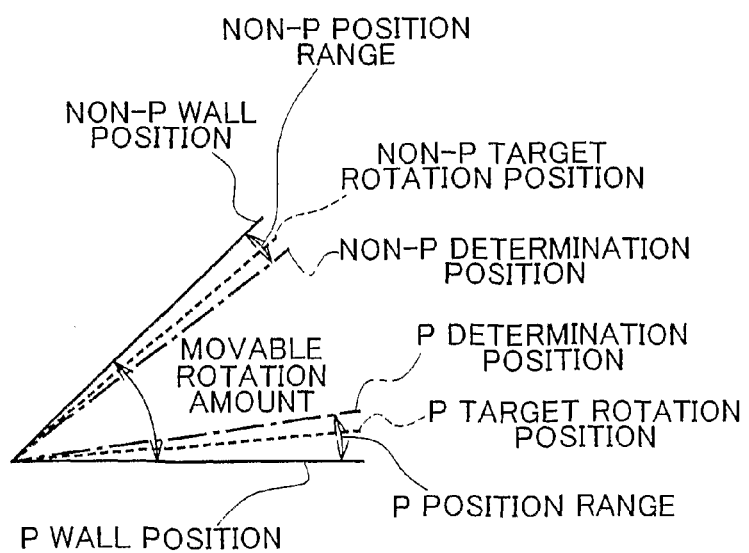
FIG. 5 is a view that illustrates a correspondence relationship between the rotation amount of a P lock drive motor, that is, an encoder count, and a shift position.

FIG. 5 is a view that illustrates a correspondence relationship between the rotation amount of the P lock drive motor 68, that is, an encoder count, and a shift position. The P lock drive motor 68 drives the detent plate 74 for rotation, and the rotation amount of the P lock drive motor 68 is restricted by the non-P wall 94 and the P wall 96. FIG. 5 conceptually shows the position of the P wall 96 (P wall position) and the position of the non-P wall 94 (non-P position) for controlling the rotation of the P lock drive motor 68. The rotation amount from the P wall position to the non-P wall position is termed a movable rotation amount of the P lock drive motor 68. In addition, a P determination position and a non-P determination position shown in FIG. 5 each are a predetermined position of the detent plate 74 at which it is determined whether the shift position is changed. That is, a range from the P determination position to the P wall position is a P position range, and a range from the non-P determination position to the non-P wall position is a non-P position range. When the rotation amount of the P lock drive motor 68 detected by the encoder 70 falls within the P position range, it is determined that the shift position is the P position; whereas, when the rotation amount of the P lock drive motor 68 falls within the non-P position range, it is determined that the shift position is the non-P position. Note that when the rotation amount of the P lock drive motor 68 falls in a range between the P determination position and the non-P determination position, it is determined that the shift position is indeterminate or the shift position is being changed. The above determination is executed by the P-ECU 106.

In addition, as shown in FIG. 5, the P target rotation position is set within the P position range, and the non-P target rotation position is set within the non-P position range. The P target rotation position is a position at which the P wall 96 does not collide with the roller 84 of the detent spring 82 when changing from the non-P position to the P position, and is determined with a predetermined margin from the P wall position. The predetermined margin is loosely set in consideration of backlash due to aged deterioration, or the like. By so doing, when the use of the detent plate 74 is a certain degree, aged degradation may be absorbed, and it is possible to avoid an impact between the P wall 96 and the roller 84 when the shift position is changed from the non-P position to the P position. Similarly, the non-P target rotation position is a position at which the non-P wall 94 does not collide with the roller 84 of the detent spring 82 when changing from the P position to the non-P position, and is determined with a predetermined margin from the non-P wall position. The predetermined margin is loosely set in consideration of backlash due to aged degradation, or the like. By so doing, when the use of the detent plate 74 is a certain degree, aged degradation may be absorbed, and it is possible to avoid an impact between the non-P wall 94 and the roller 84 when the shift position is changed from the P position to the non-P position. Note that it is not necessary that the margin from the non-P wall position is equal to the margin from the P wall position; the margins may be different depending on the shape, or the like, of the detent plate 74.

In the thus configured parking lock device 16, the P-ECU 106 acquires the encoder count corresponding to the rotation amount of the P lock drive motor 68 on the basis of the pulse signal output from the encoder 70. In addition, the P-ECU 106, for example, sets the encoder count at zero when the status of power supplied to the vehicle 10 is the ALL-OFF status or the ACC-ON status. When the status of power supplied to the vehicle 10 is switched from the ALL-OFF status or the ACC-ON status to the IG-ON status, the P-ECU 106 sequentially updates the encoder count on the basis of a signal output from the encoder 70 thereafter. Note that, in the present embodiment, the P-ECU 106 sets the encoder count caused by rotation in the direction toward the P wall position (rotation in the arrow C direction in FIG. 3) as a negative value. In addition, the P-ECU 106 controls the P lock drive motor 68 so that the acquired encoder count coincides with a preset target encoder count (target count value). The target count value is, for example a target value that is empirically obtained and set for stopping the P lock drive motor 68 at the P target rotation position or the non-P target rotation position.

The correspondence relationship between the rotation amount of the P lock drive motor 68 and the shift position is described above. Incidentally, the encoder 70 is a relative position sensor, so it is necessary to acquire the absolute position of the P lock drive motor 68. Hereinafter, a method of executing position control over the P lock drive motor 68 using the encoder 70 that detects relative position information will be specifically described.

Figure 6:
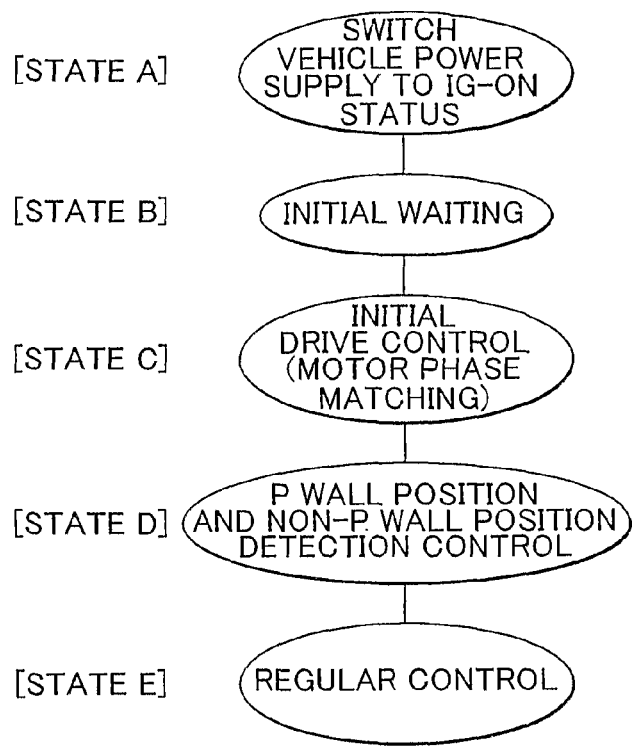
FIG. 6 is a state transition diagram that illustrates a series of initial controls in the parking lock device when the status of power supplied to the vehicle 10 enters an IG-ON status.

FIG. 6 is a state transition diagram that illustrates a series of initial controls in the parking lock device 16 when the status of power supplied to the vehicle 10 is switched from the ALL-OFF status or the ACC-ON status to the IG-ON status and the P-ECU 106 is switched from the wake status to the start-up status. As shown in FIG. 6, as the status of power supplied to the vehicle 10 is switched to the IG-ON status by the PM-ECU 102 [state A], the P-ECU 106 initially waits a period of time for waiting connection of a relay of the P lock drive motor 68 [state B]. In the state B, for example, the P-ECU 106 executes initial process of the P-ECU 106 itself in the wake status. Subsequently, in order to appropriately control the rotation of the P lock drive motor 68, the P-ECU 106 executes initial drive control of the P lock drive motor 68, such as excitation matching (phasing) of the P lock drive motor 68 [state C]. After that, the P-ECU 106 detects the P wall position and non-P wall position of the P lock drive motor 68 and sets reference positions [state D]. After the P-ECU 106 sets the reference positions, the P-ECU 106, for example, executes regular control for activating or releasing parking lock on the basis of the operation of the P switch 34 by the user [state E]. Hereinafter, a control method for detecting the P wall position and the non-P wall position in the above (state D) will be described.

Figure 7:
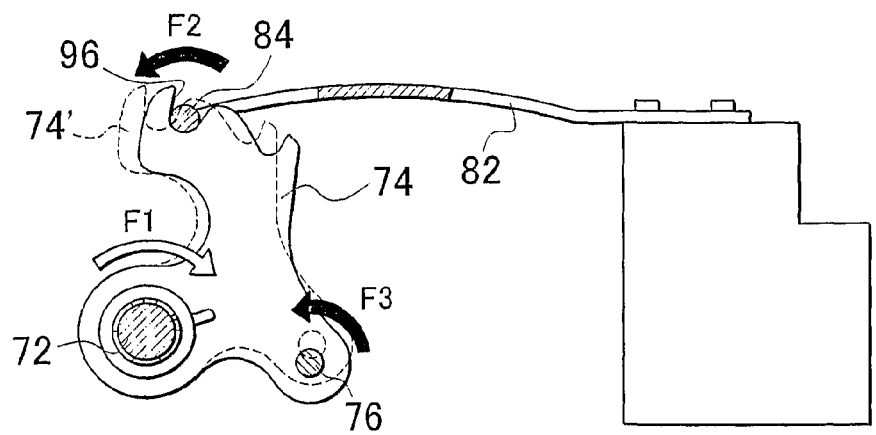
FIG. 7 is a view for illustrating a control method for detecting a P wall position.

FIG. 7 is a view for illustrating a control method for detecting the P wall position. In P wall position detection control, the P-ECU 106 initially drives the P lock drive motor 68 to rotate the detent plate 74 in the arrow C direction indicated in FIG. 3, that is, in a direction in which the P wall 96 approaches the roller 84 of the detent spring 82, to bring the roller 84 and the P wall 96 into contact with each other. The P wall 96 functions as a restricting member that restricts the rotation of the P lock drive motor 68 in the arrow C direction indicated in FIG. 3 as a predetermined direction at the P position 92, that is, at the P position as a predetermined shift position. Note that the P wall 96 may constitute a restricting member in cooperation with the detent spring 82 and the roller 84. As shown in FIG. 7, the arrow F1 indicates the rotation force exerted by the P lock drive motor 68, the arrow F2 indicates the spring force exerted by the detent spring 82, and the arrow F3 indicates the push-back force exerted by the rod 76. The detent plate 74' indicated by the dotted line represents a position at which the P wall 96 contacts the roller 84. Thus, detecting the position of the detent plate 74' corresponds to detecting the position of the P wall 96.

Even after the P wall 96 contacts the roller 84, the detent plate 74 is rotated by the rotation force F1 of the P lock drive motor 68 against the spring force of the detent spring 82 from the position indicated by the dotted line in the arrow C direction indicated in FIG. 3. By so doing, the detent spring 82 deflects, so the spring force F2 increases, and the push-back force F3 exerted by the rod 76 also increases. When the rotation force F1 balances with the sum of the spring force F2 and the push-back force F3, the rotation of the detent plate 74 stops.

The P-ECU 106 determines whether the rotation of the detent plate 74 is stopped on the basis of the acquired encoder count. For example, when the minimum value or maximum value of the encoder count remains unchanged for a predetermined period of time, the P-ECU 106 determines that the rotation of the detent plate 74 and the rotation of the P lock drive motor 68 are stopped. It is only necessary to set which value of the encoder count to be monitored, the minimum value or the maximum value, on the basis of the encoder 70. In any cases, the fact that the minimum value or the maximum value remains unchanged for a predetermined period of time indicates that the detent plate 74 is not moving.

The P-ECU 106 detects the position of the detent plate 74 at the time of rotation stop as a temporary P wall position (hereinafter, referred to as "temporary P wall position"), and further calculates the deflection amount or deflection angle of the detent spring 82. The deflection amount or the deflection angle is calculated, for example, using a map that shows the relationship of the deflection amount or the deflection angle corresponding to a voltage applied to the P lock drive motor 68. The map is prestored in the P-ECU 106. The P-ECU 106 calculates the deflection amount or the deflection angle corresponding to a voltage applied to the P lock drive motor 68 at the time of detecting the temporary P wall position from the map. Note that, instead of a voltage applied to the P lock drive motor 68, a map may use a voltage $V_{BAT}$ of the electrical storage device 46. The voltage $V_{BAT}$ of the electrical storage device 46 is, for example, monitored by the P-ECU 106, and may be easily detected. Note that, in this case, the map is created in consideration of a decrease in voltage due to a wire harness, or the like, from the electrical storage device 46 to the P lock drive motor 68.

The P-ECU 106 carries out map correction on the temporary P wall position on the basis of the deflection amount or the deflection angle calculated using the map, and then determines the map-corrected position as the P wall position. At this time, the P-ECU 106 sets the encoder count to CNTP at the set P wall position. Then, the P-ECU 106 drives the P lock drive motor 68 so as to reset the encoder count to zero to rotate the detent plate 74 in the arrow D direction indicated in FIG. 3, that is, in a direction in which the P wall 96 moves away from the roller 84 of the detent spring 82 to thereby set the position of the detent plate 74 at a predetermined P position. The predetermined P position is a predetermined position that is present within the P position range, and is set so that an encoder count difference from the set P wall position becomes CNTP. In addition, the predetermined P position may be set at the P target rotation position. In this way, it is possible to set the P target rotation position by setting the P wall position. Note that, instead of the map that represents the relationship of the deflection amount or the deflection angle corresponding to an applied voltage, a map may represent the relationship of the deflection amount or the deflection angle corresponding to an output torque of the P lock drive motor 68 or, instead of calculation using the map, it is also applicable that a sensor is used to detect the deflection amount or the deflection angle.

Figure 8:
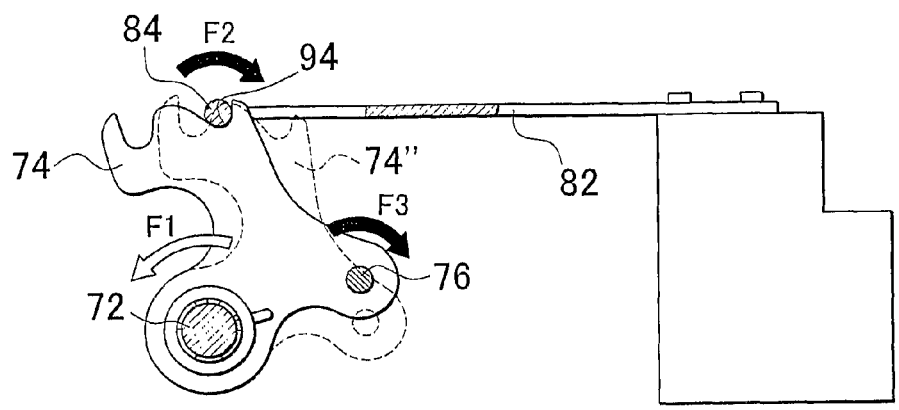
FIG. 8 is a view for illustrating a control method for detecting a non-P wall position.

FIG. 8 is a view for illustrating a control method for detecting the non-P wall position. In non-P wall position detection control, the P-ECU 106 initially drives the P lock drive motor 68 to rotate the detent plate 74 in the arrow D direction indicated in FIG. 3, that is, a direction in which the non-P wall 94 moves toward the roller 84 of the detent spring 82, to thereby bring the roller 84 into contact with the non-P wall 94. The non-P wall 94 functions as a restricting member that restricts the rotation of the P lock drive motor 68 in the arrow D direction indicted in FIG. 3 as a predetermined direction at the non-P position 90, that is, the non-P position as a predetermined shift position. Note that the non-P wall 94 may form the restricting member in cooperation with the detent spring 82 and the roller 84. As shown in FIG. 8, the arrow F1 indicates the rotation force exerted by the P lock drive motor 68, the arrow F2 indicates the spring force exerted by the detent spring 82, and the arrow F3 indicates the tensile force exerted by the rod 76. The detent plate 74" indicated by the dotted line represents a position at which the non-P wall 94 contacts the roller 84. Thus, detecting the position of the detent plate 74" corresponds to detecting the position of the non-P wall 94.

Even after the non-P wall 94 contacts the roller 84, the detent plate 74 is rotated by the rotation force F1 of the P lock drive motor 68 against the tensile force of the detent spring 82 from the position indicated by the dotted line in the arrow D direction indicated in FIG. 3. By so doing, the detent spring 82 extends, so the spring force F2 increases, and the tensile force F3 exerted by the rod 76 also increases. When the rotation force F1 balances with the sum of the spring force F2 and the tensile force F3, the rotation of the detent plate 74 stops.

The P-ECU 106 determines whether the rotation of the detent plate 74 is stopped on the basis of the acquired encoder count. For example, when the minimum value or maximum value of the encoder count remains unchanged for a predetermined period of time, the P-ECU 106 determines that the rotation of the detent plate 74 and the rotation of the P lock drive motor 68 are stopped.

The P-ECU 106 detects the position of the detent plate 74 at the time of rotation stop as a temporary non-P wall position (hereinafter, referred to as "temporary non-P wall position"), and further calculates the extension amount of the detent spring 82. The extension amount is calculated, for example, using a map that shows the relationship of the extension amount corresponding to a voltage applied to the P lock drive motor 68. The map is prestored in the P-ECU 106. The P-ECU 106 calculates the extension amount corresponding to a voltage applied to the P lock drive motor 68 at the time of detecting the temporary non-P wall position from the map.

The P-ECU 106 carries out map correction on the temporary non-P wall position on the basis of the extension amount calculated using the map, and then determines the map-corrected position as the non-P wall position. At this time, the P-ECU 106 sets the encoder count to CNTP at the set non-P wall position. Then, the P-ECU 106 drives the P lock drive motor 68 so as to set the encoder count to an encoder count CP reduced by a predetermined count value to rotate the detent plate 74 in the arrow C direction indicated in FIG. 3, that is, in a direction in which the non-P wall 94 moves away from the roller 84 of the detent spring 82, to thereby set the position of the detent plate 74 at a predetermined non-P position. The predetermined non-P position is a predetermined position that is present within the non-P position range, and is set so that an encoder count difference from the set non-P wall position becomes a predetermined count value. In addition, the predetermined non-P position may be set at the non-P target rotation position. In this way, it is possible to set the non-P target rotation position by setting the non-P wall position. Note that, instead of the map that represents the relationship of the extension amount corresponding to an applied voltage, a map may represent the relationship of the extension amount corresponding to an output torque of the P lock drive motor 68 or, instead of calculation using the map, it is also applicable that a sensor is used to detect the extension amount.

In this way, in the start-up status of the P-ECU 106 where the status of power supplied to the vehicle 10 is the IG-ON status, when the P lock drive motor 68 is moved in a direction in which movement (rotation) of the P lock drive motor 68 is restricted, the wall position of the P lock drive motor 68 corresponding to a predetermined shift position is detected on the basis of the acquired encoder count to thereby make it possible to set a reference position.

Figure 9:
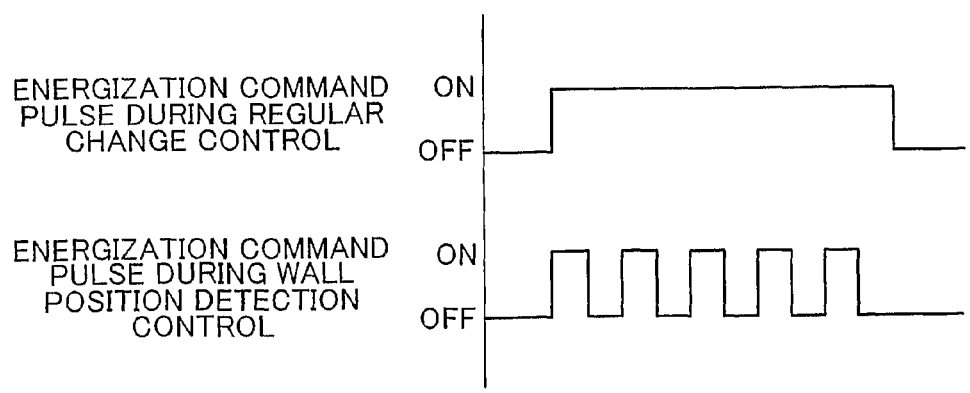
FIG. 9 is a view for illustrating the waveform of an energization command pulse applied to an actuator (lock drive motor)

FIG. 9 is a view that illustrates the waveform of an energization command pulse applied to the P lock drive motor 68. At the time of regular control for changing the shift position, a signal having a long duration of high level is applied to the P lock drive motor 68 as an energization command pulse. On the other hand, at the time of wall position detection control by the P-ECU 106, a signal that decreases an output per unit time of the P lock drive motor 68 as compared with an output per unit time of the P lock drive motor 68 at the time of regular control for changing the shift position is applied to the P lock drive motor 68 as an energization command pulse. Specifically, the on duration of the energization command pulse applied to the P lock drive motor 68 is reduced. By reducing the rotational speed of the P lock drive motor 68 at the time of wall position detection control, it is possible to reduce an impact between the wall (the non-P wall 94 or the P wall 96) and the roller 84. Note that, for example, when the energization command pulse shown in FIG. 9 is on and the energization commands for the UVW three phases in the P lock drive motor 68 are on, each of the UVW three phases is energized.

As described above, when the status of power supplied to the vehicle 10 is switched to the IG-ON status, that is, when the P-ECU 106 is switched to the start-up status, initial process of the P-ECU 106 itself is executed while the P-ECU 106 is in the wake status, and then initial control in the parking lock device 16 is executed while the P-ECU 106 is started up to thereby detect the wall position. That is, as the initial control in the parking lock device 16, initial drive control over the P lock drive motor 68 is executed, and, subsequently, the P wall position and non-P wall position of the P lock drive motor 68 are detected to set the reference position. That is, the actual movable rotation amount of the P lock drive motor 68 falls within the range between the two wall positions, and may be measured in such a manner that the wall position detection control for one shift position is executed to detect the wall position and then the wall position detection control for the other shift position is executed to detect the other wall position. Then, the absolute position of the P lock drive motor 68 may be acquired by detecting the wall positions, so it is possible to set the target rotation positions.

Incidentally, as described above, the vehicle 10 according to the present embodiment is able to undergo plug-in charging in which the electrical storage device 46 of the vehicle 10 is charged via a cord that is connected to a power supply device, such as a domestic power supply and a charging station. During the plug-in charging, even when the status of power supplied to the vehicle 10 is the ALL-OFF status or the ACC-ON status, the P lock setting request signal for setting the P position by the HV-ECU 104 is output to the P-ECU 106 in order to perform plug-in charging at the P position (P lock state). Then, as the P lock setting request signal is detected by the P-ECU 106 placed in the wake status, even when the status of power supplied to the vehicle 10 is the ALL-OFF status or the ACC-ON status, the P-ECU 106 is started up. Then, a series of initial controls in the parking lock device 16 are executed, and the parking lock device 16 is activated to thereby set the P position (P lock state). That is, a series of initial controls in the parking lock device 16, executed by the P-ECU 106 when the status of power supplied to the vehicle 10 is switched from the ALL-OFF status or the ACC-ON status to the IG-ON, are also executed in the ALL-OFF status or the ACC-ON status, and, after that, the shift position is set at the P position. At this time, the P lock status signal that indicates that the shift position is the P position is output by the P-ECU 106 to the HV-ECU 104, the P lock display control command signal is output by the HV-ECU 104 to the P switch 34 on the basis of the P lock status signal, and then the P position indicator lamp 62 in the P switch 34 is turned on. That is, even when the status of power supplied to the vehicle 10 is the ALL-OFF status or the ACC-ON status, the P-ECU 106 is started up in order to set the P lock state by an external factor, such as plug-in charging, other than switching into the IG-ON status, and then the P lock state is set to turn on the P position indicator lamp 62. Such illumination of the P position indicator lamp 62 based on parking lock without shift operation indicates not particularly useful information to the user. When the status of power supplied to the vehicle 10 is the ALL-OFF status or the ACC-ON status in which the combination meter 56, or the like, is not turned on, the illumination may possibly dazzle the user. In addition, there is a possibility that the charging efficiency of plug-in charging decreases because of illumination of the P position indicator lamp 62. In addition, different from the above problem, for example, when the P position indicator lamp 62 is turned off after the P lock state is set and the status of power is switched to the ALL-OFF status, as plug-in charging is performed while the P-ECU 106 is in operation, the set P lock state is maintained and it is not necessary to set the P lock state again, so the P position indicator lamp 62 may remain turned off. Therefore, there is a possibility that the P position indicator lamp 62 is turned on or off depending on a timing of plug-in charging, so this causes a possible misunderstanding of the user as a malfunction, or the like.

Then, in the present embodiment, in order to appropriately turn on or off the P position indicator lamp 62, when the electronic control unit 100 sets the P lock state on the basis of a predetermined request signal for setting the P lock state (P position), the electronic control unit 100 turns on or off the P position indicator lamp 62 on the basis of the status of power supplied to the vehicle 10.

Here, the case where the P position indicator lamp 62 is turned on when the P lock state is set will be studied. First, when the status of power supplied to the vehicle 10 is the IG-ON status, the combination meter 56 is originally turned on, so it is presumable that this case prevents the illumination from dazzling the user even when the P position indicator lamp 62 is turned on. Then, for example, when the status of power supplied to the vehicle 10 is the IG-ON status, the electronic control unit 100 turns on the P position indicator lamp 62.

In addition, as described above, in the vehicle 10 according to the present embodiment, as an input of a power switch signal from the vehicle power switch 40 is continuously detected for several seconds or longer (for example, 3 seconds or longer) during vehicle driving, the status of power supplied to the vehicle 10 is switched from the IG-ON status to the ACC-ON status, and the shift position is set at the N position. In this case, after that, as the P switch 34 is depressed by the user for fixing the vehicle 10, the shift position is switched to the P position. Then, for example, when the status of power supplied to the vehicle 10 is switched from the IG-ON status during vehicle driving to the ACC-ON status, the electronic control unit 100 turns on the P position indicator lamp 62. Note that the predetermined request signal when the status of power supplied to the vehicle 10 is switched from the IG-ON status during vehicle driving to the ACC-ON status is, for example, the P lock change request signal for setting the P lock state. The P lock change request signal is output by the HV-ECU 104 on the basis of the P switch signal from the P switch 34 as the position signal in the shift operating device 30.

Furthermore, as described above, in the vehicle 10 according to the present embodiment, as an input of the power switch signal is detected when the vehicle speed V is lower than the predetermined stop vehicle speed V' in the IG-ON status at the non-P position, "auto P operation" is executed. In the "auto P operation", after the shift position is automatically set at the P position, the status of power supplied to the vehicle 10 is switched to the ALL-OFF status. In this case, because the shift position is changed to the P position without user's operation, it is presumably desirable to notify the user that the P lock is activated. Then, for example, within a predetermined period of time from when the status of power supplied to the vehicle 10 is switched from the IG-ON status to the ALL-OFF status, the electronic control unit 100 turns on the P position indicator lamp 62. Note that the predetermined request signal within a predetermined period of time from when the status of power supplied to the vehicle 10 is switched from the IG-ON status to the ALL-OFF status is, for example, an auto P lock change request signal for automatically setting the shift position at the P position. The auto P lock change request signal is output by the PM-ECU 102 as the status of power supplied to the vehicle 10 is switched from the IG-ON status to the ALL-OFF status. In addition, the predetermined period of time is, for example, a turn-on duration of the P position indicator lamp 62, calculated in advance on the basis of ergonomics, or the like, as a period of time during which the user can recognize the P lock state, and is set to about several seconds (for example, 1 to 3 seconds).

Then, at the time of setting the P lock state, when the status of power supplied to the vehicle 10 is other than when the status of power is the IG-ON status, when the status of power is switched from the IG-ON status during vehicle driving to the ACC-ON status or within a predetermined period of time from when the status of power is switched from the IG-ON status to the ALL-OFF status, the electronic control unit 100 turns off the P position indicator lamp 62, for example, when the status of power supplied to the vehicle 10 is the ALL-OFF status or when the status of power supplied to the vehicle 10 is raised from the ALL-OFF status to the ACC-ON status. That is, when the status of power supplied to the vehicle 10 is the ALL-OFF status or is raised from the ALL-OFF status to the ACC-ON status, the P-ECU 106 turns off the P position indicator lamp 62 on purpose even when the P-ECU 106 is switched from the wake status to the start-up status to set the P lock state and the condition for turning on the P position indicator lamp 62 is satisfied. Note that the predetermined request signal when the status of power supplied to the vehicle 10 is the ALL-OFF status, when the status of power supplied to the vehicle 10 is raised from the ALL-OFF status to the ACC-ON status or when the status of power supplied to the vehicle 10 is the IG-ON status is presumably, for example, a P lock setting request signal for setting the P position. The P lock setting request signal is output by the HV-ECU 104 when the plug-in charging is performed.

Figure 10:
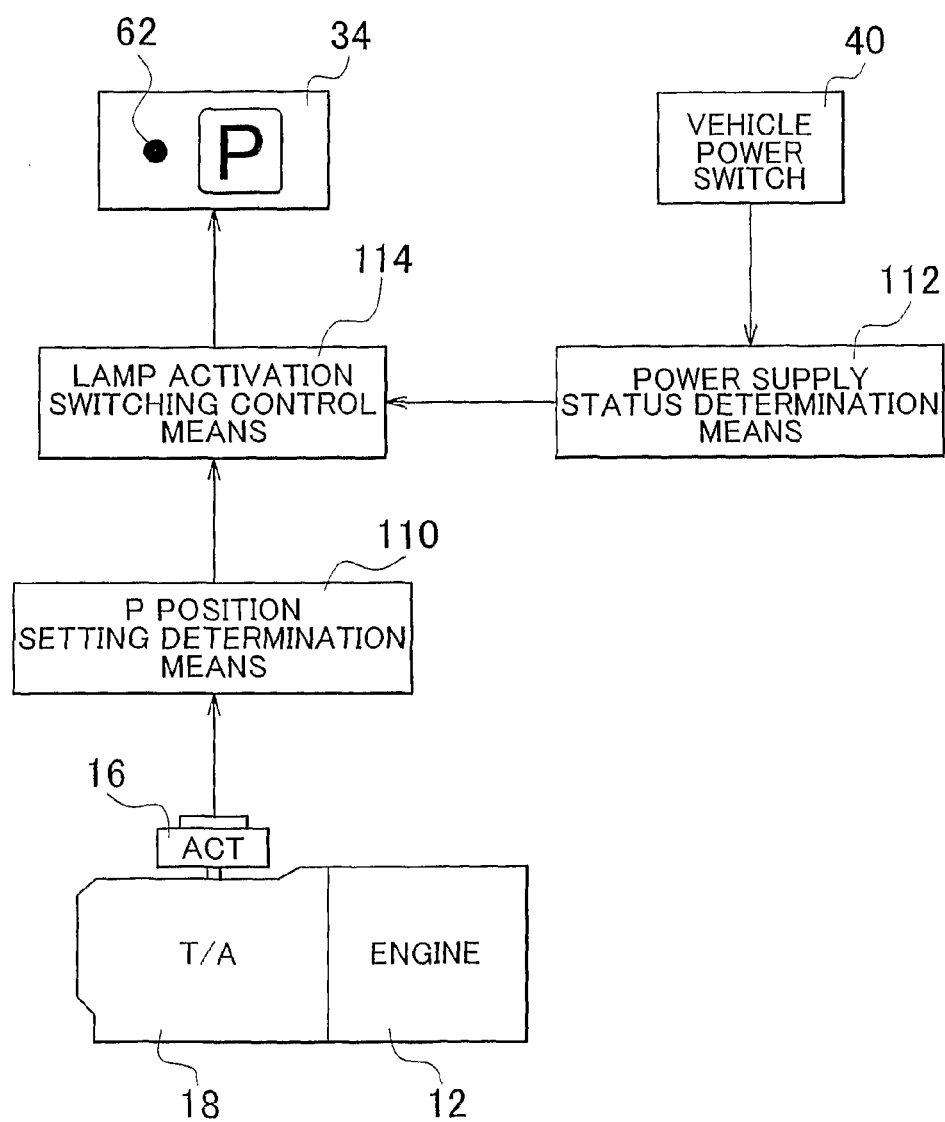
FIG. 10 is a functional block diagram that illustrates a relevant portion of control function of an electronic control unit.

FIG. 10 is a functional block diagram that illustrates a relevant portion of control function executed by the electronic control unit 100. As shown in FIG. 10, a P position setting determination unit, that is, P position setting determination means 110, for example, determines whether the P position is set on the basis of the predetermined request signal. The predetermined request signal is any one of the P lock setting request signal, the auto P lock change request signal and the P lock change request signal. For example, the P position setting determination means 110 determines, on the basis of the P position signal and the P lock status signal, whether the parking lock device 16 is activated to set the P position (P lock state) on the basis of the predetermined request signal.

A power supply status determination unit, that is, power supply status determination means 112, for example, determines whether the status of power supplied to the vehicle 10 is the IG-ON status. In addition, the power supply status determination means 112, for example, determines whether the status of power supplied to the vehicle 10 is switched from the IG-ON status during vehicle driving to the ACC-ON status. In addition, the power supply status determination means 112, for example, determines whether it falls within a predetermined period of time from when the status of power supplied to the vehicle 10 is switched from the IG-ON status to the ALL-OFF status.

When the P position setting determination means 110 determines that the P position is set, and when the power supply status determination means 112 determines at least one of the fact that the status of power supplied to the vehicle 10 is the IG-ON status, the fact that the status of power supplied to the vehicle 10 is switched from the IG-ON status during vehicle driving to the ACC-ON status and the fact that it falls within a predetermined period of time from when the status of power supplied to the vehicle 10 is switched from the IG-ON status to the ALL-OFF status, a lamp activation switching control unit, that is, lamp activation switching control means 114, outputs the P lock display control command signal for displaying the P lock state (P position) to the P switch 34, and then turns on the P position indicator lamp 62 in the P switch 34. On the other hand, when the P position setting determination means 110 determines that the P position is set, and when the power supply status determination means 112 negates all of the fact that the status of power supplied to the vehicle 10 is the IG-ON status, the fact that the status of power supplied to the vehicle 10 is switched from the IG-ON status during vehicle driving to the ACC-ON status and the fact that it falls within a predetermined period of time from when the status of power supplied to the vehicle 10 is switched from the IG-ON status to the ALL-OFF status, the lamp activation switching control means 114 turns off the P position indicator lamp 62 without outputting the P lock display control command signal.

FIG. 11 is a flowchart that illustrates a relevant portion of control operation of the electronic control unit 100, that is, control operation for appropriately turning on or off the P position indicator lamp 62, and the flowchart is, for example, repeatedly executed at an extremely short cycle time of about several milliseconds to several tens of milliseconds.

First, in step S10 (hereinafter the word "step" is omitted) executed by the P position setting determination means 110, it is, for example, determined, on the basis of the P position signal and the P lock status signal, whether the parking lock device 16 is activated on the basis of the predetermined request signal to set the P position (P lock state). The predetermined request signal is any one of the P lock setting request signal, the auto P lock change request signal and the P lock change request signal. When the determination in S10 is negative, the routine ends. When the determination in S10 is affirmative, in S20 executed by the power supply status determination means 112, it is determined whether the status of power supplied to the vehicle 10 is the IG-ON status. When the determination in S20 is negative, in S30 executed by the same power supply status determination means 112, it is determined whether the status of power supplied to the vehicle 10 is switched from the IG-ON status during vehicle driving to the ACC-ON status. When the determination in S30 is negative, in S40 executed by the same power supply status determination means 112, it is determined whether it falls within a predetermined period of time from when the status of power supplied to the vehicle 10 is switched from the IG-ON status to the ALL-OFF status. When the determination in S40 is negative, in S50 executed by the lamp activation switching control means 114, the P position indicator lamp 62 is turned off without outputting the P lock display control command signal. On the other hand, when the determination in at least any one of S20, S30 and S40 is affirmative, in S60 executed by the same lamp activation switching control means 114, the P lock display control command signal is output to the P switch 34 and then the P position indicator lamp 62 is turned on.

As described above, with the present embodiment, when the P lock state is set on the basis of a predetermined request signal for setting the P lock state (P position), the P position indicator lamp 62 is turned on or off on the basis of the status of power supplied to the vehicle 10. Thus, for example, when the status of power supplied to the vehicle 10 is raised to the ALL-OFF status or the ACC-ON status where the combination meter 56, or the like, is not turned on, it is possible to reliably turn off the P position indicator lamp 62. This prevents indication of not particularly useful information, such as illumination of the P position indicator lamp 62 at the time of P lock without shift operation, to the user, and prevents the illumination from dazzling the user in the ALL-OFF status, the ACC-ON status, or the like. In addition, for example, when the status of power supplied to the vehicle 10 is the IG-ON status where the combination meter 56, or the like, is turned on, it is possible to reliably turn on the P position indicator lamp 62. By so doing, for example, even when not particularly useful information, such as illumination of the P position indicator lamp 62 at the time of P parking lock without shift operation, is indicated to the user, the combination meter 56, or the like, is originally turned on, so this prevents the illumination of the indicator lamp 62 from dazzling the user. In addition, for example, it is possible to turn off the P position indicator lamp 62 when the status of power is raised to the ALL-OFF status or the ACC-ON status during plug-in charging, so this prevents a possible decrease in the charging efficiency of plug-in charging due to the illumination of the P position indicator lamp 62. Other than the above, the P position indicator lamp 62 is uniformly turned on or off on the basis of the status of power supplied to the vehicle 10, so it is possible to uniformly indicate a vehicle state (P lock state) for user's same operation, and this prevents a possible misunderstanding of the user as a malfunction, or the like. In this way, when the P lock state is set on the basis of a predetermined request signal for setting the P lock state, the P position indicator lamp 62 may be appropriately turned on or off.

In addition, with the present embodiment, the P position indicator lamp 62 is turned off when the status of power supplied to the vehicle 10 is the ALL-OFF status or when the status of power supplied to the vehicle 10 is raised from the ALL-OFF status to the ACC-ON status. Thus, for example, this prevents indication of not particularly useful information, such as illumination of the P position indicator lamp 62 at the time of parking lock without shift operation, to the user, and prevents the illumination from dazzling the user when the status of power is the ALL-OFF status or is raised from the ALL-OFF status to the ACC-ON status. In addition, for example, it is possible to turn off the P position indicator lamp 62 when the status of power is the ALL-OFF status or is raised from the ALL-OFF status to the ACC-ON status during plug-in charging, so this prevents a possible decrease in the charging efficiency of plug-in charging due to illumination of the P position indicator lamp 62. Other than the above, the P position indicator lamp 62 is uniformly turned off when the status of power is the ALL-OFF status or is raised from the ALL-OFF status to the ACC-ON status, so this prevents a possible misunderstanding of the user as a malfunction, or the like.

In addition, with the present embodiment, the predetermined request signal is a P lock setting request signal for setting the P position. The P lock setting request signal is output when the plug-in charging is performed. Thus, when the P lock state is set at the time of charging the electrical storage device 46, the P position indicator lamp 62 is appropriately turned on or off on the basis of the status of power supplied to the vehicle 10.

In addition, with the present embodiment, when the status of power supplied to the vehicle 10 is the IG-ON status, the P position indicator lamp 62 is turned on. Then, for example, the combination meter 56, or the like, is originally turned on in the IG-ON status, so this prevents the illumination of the P position indicator lamp 62 from dazzling the user. Other than the above, the P position indicator lamp 62 is uniformly turned on in the IG-ON status, so this prevents a possible misunderstanding of the user as a malfunction, or the like.

In addition, with the present embodiment, when the P lock state is set on the basis of a P lock change request signal for setting the P lock state, the P position indicator lamp 62 is turned on when the status of power supplied to the vehicle 10 is switched from the IG-ON status during vehicle driving to the ACC-ON status. The P lock change request signal is output on the basis of the P switch signal from the P switch 34. Therefore, when the status of power supplied to the vehicle 10 is switched from the IG-ON status during vehicle driving to the ACC-ON status, that is, even when the status of power supplied to the vehicle 10 is the ACC-ON status where the combination meter 56, or the like, is turned off, the P position indicator lamp 62 is appropriately turned on when the P lock state is set through user's operation. Other than the above, the P position indicator lamp 62 is uniformly turned on when the status of power is switched from the IG-ON status during vehicle driving to the ACC-ON status, so this prevents a possible misunderstanding of the user as a malfunction, or the like.

In addition, with the present embodiment, when the P lock state is set on the basis of an auto P lock change request signal for setting the P position, the P position indicator lamp 62 is turned on within a predetermined period of time from when the status of power supplied to the vehicle 10 is switched from the IG-ON status to the ALL-OFF status. The auto P lock change request signal is output as the status of power supplied to the vehicle 10 is switched from the IG-ON status to the ALL-OFF status. Therefore, within the predetermined period of time from when the status of power supplied to the vehicle 10 is switched from the IG-ON status to the ALL-OFF status, that is, even when the status of power supplied to the vehicle 10 is the ALL-OFF status where the combination meter 56, or the like, is turned off, the P position indicator lamp 62 is appropriately turned on for a predetermined period of time when the P lock state is set as the status of power supplied to the vehicle 10 is switched from the IG-ON status to the ALL-OFF status. Other than the above, the P position indicator lamp 62 is uniformly turned on within the predetermined period of time from when the status of power supplied is switched from the IG-ON to the ALL-OFF, so this prevents a possible misunderstanding of the user as a malfunction, or the like.

The embodiment of the invention is described in detail on the basis of the accompanying drawings; however, the aspect of the invention may be applied to another embodiment.

For example, in the above described embodiment, when the status of power supplied to the vehicle 10 is the ALL-OFF status or when the status of power supplied to the vehicle 10 is raised from the ALL-OFF status to the ACC-ON status, the P position indicator lamp 62 is turned off; instead, when the predetermined request signal is a P lock setting request signal that is output when the plug-in charging is performed, the P position indicator lamp 62 may be turned on within a predetermined period of time from when the plug-in charging is started. In this case, step S50 in the flowchart shown in FIG. 11 will be, for example, "turn off the indicator after a lapse of a predetermined period of time from when the plug-in charging is started". This also prevents the illumination of the P position indicator lamp 62 from dazzling the user at the time of charging the electrical storage device 46. In addition, this prevents a decrease in the charging efficiency at the time of charging the electrical storage device 46. Other than the above, this prevents a possible misunderstanding of the user as a malfunction, or the like, at the time of charging the electrical storage device 46.

In addition, in the above described embodiment, in the plug-in charging, the electrical storage device 46 is charged with electric power from the commercial power supply 50 via the inverter 48; however, the type of plug-in charging is not necessarily limited to this configuration. For example, in the plug-in charging, the electrical storage device 46 may be charged with electric power from the commercial power supply 50 not via the inverter 48 but via a charging device separately provided for the vehicle 10, an external charging device, or the like.

In addition, in the above described embodiment, when the status of power supplied to the vehicle 10 is the ALL-OFF status, the P lock setting request signal for setting the P position, output by the HV-ECU 104 at the time of performing the plug-in charging, is used as the predetermined request signal at the time when the status of power is raised from the ALL-OFF status to the ACC-ON status; however, the predetermined request signal is not necessarily limited to the P lock setting request signal. For example, even when the status of power supplied to the vehicle 10 is the ALL-OFF status or is raised from the ALL-OFF status to the ACC-ON status, as long as the P lock setting request signal is based on control necessary for setting the P lock state by switching the P-ECU 106 into the start-up status because of an external factor other than switching of the status of power or shift operation, the aspect of the invention may be applied.

In addition, in the above described embodiment, the shift lever 32 is operated two-dimensionally; instead, the shift lever 32 may be operated along one axis or may be operated three-dimensionally.

In addition, in the above described embodiment, the shift sensor 36 and the select sensor 38 are provided as position sensors for detecting the position of the shift lever 32; however, the number of position sensors is not limited to two.

In addition, the shift lever 32 according to the above described embodiment is a momentary lever switch that is operated to a plurality of operating positions $P_{SH}$; instead, the shift lever 32 may be, for example, a push-button-type switch, a slide-type switch, or the like. Furthermore, the shift operating device 30 may be operated not through manual operation but by foot or may be operated in response to a driver's speech sound. In addition, the operating device for changing the shift position is the shift operating device 30 that includes the shift lever 32 and the P switch 34; however, the operating device is not limited to the shift operating device 30. It is only necessary that the operating device converts driver's shift intention into an electrical signal. For example, the operating device may include operating positions, such as "P", "R", "N", "D", and the like, corresponding to the shift positions, a shift lever (shift operating member) that is operated to those operating positions, and an operating position sensor that electrically detects that the shift lever is operated to any one of the operating positions. By so doing as well, the aspect of the invention may be applied.

Note that the above described embodiment is only illustrative; the aspect of the invention may be modified or improved in various forms on the basis of the knowledge of the person skilled in the art.

The invention claimed is:

1. A vehicle shift control system comprising:
a parking lock device that changes rotation teeth, rotating integrally with a drive wheel, between a locked state where a lock tooth engages the rotation teeth and a non-locked state where the locked state is released;
a lock indicator lamp that, when lit, indicates the parking lock device is in the locked state; and
an electronic control unit configured to automatically control the lock indicator lamp to be either on or off, without user intervention, in accordance with a status of power supplied to a vehicle,
wherein the parking lock device is activated on the basis of a request signal to change the rotation teeth between the locked state and the non-locked state to thereby electrically change a shift position for vehicle driving,
the status of power supplied to the vehicle is at least one of:
a power off status for disabling the vehicle from running and having all systems, including ignition and accessories, off,
a partially power on status for disabling the vehicle from driving but allowing operation of only part of functions of the vehicle while a display device for indicating vehicle information related to the vehicle driving remains turned off, and
a power on status for turning on the display device and enabling the vehicle to run,
when the status of power supplied to the vehicle is the power off status for disabling the vehicle from running, the electronic control unit is configured to automatically control the lock indicator lamp to be off, without user intervention, and
when the status of power supplied to the vehicle is raised from the power off status to the partially power on status for disabling the vehicle from driving but allowing operation of only part of functions of the vehicle while the display device for indicating vehicle information related to the vehicle driving remains turned off, the electronic control unit is configured to automatically control the lock indicator lamp to be off irrespective of ambient lighting, without user intervention, even if the request signal is for changing to the locked state.

2. The vehicle shift control system according to claim 1, wherein
the vehicle includes an electric motor as a driving force source and an electrical storage device that supplies stored electric power to the electric motor,
during a stop of the vehicle, the electrical storage device is chargeable with electric power supplied from an external power supply to the vehicle, and
a predetermined request signal is the request signal for setting the locked state, which is output when the charging is performed.

3. The vehicle shift control system according to claim 2, wherein
the electronic control unit is configured to automatically control the lock indicator lamp to be on, without user intervention, within a predetermined period of time from when the charging is started.

4. The vehicle shift control system according to claim 1, wherein
when the status of power supplied to the vehicle is the power on status for turning on the display device for indicating vehicle information related to vehicle driving and enabling the vehicle to run, the electronic control unit is configured to automatically control the lock indicator lamp to be on, without user intervention.

5. The vehicle shift control system according to claim 1, wherein
when the status of power supplied to the vehicle is changed from the power on status during vehicle driving to the partially power on status for disabling the vehicle from running but allowing operation of only part of functions of the vehicle while the display device remains turned off, or within a predetermined period of time from when the status of power supplied to the vehicle is changed from the power on status to the power off status for disabling the vehicle from running, the electronic control unit is configured to automatically control the lock indicator lamp to be on, without user intervention, in a case where the status of power supplied to the vehicle is changed from the power on status during vehicle driving to the partially power on status, a predetermined request signal, which is the request signal for setting the locked state, is output on the basis of a position signal corresponding to an operating position of an operating device for changing the shift position, and in a case within the predetermined period of time from when the status of power supplied to the vehicle is changed from the power on status to the power off status, the predetermined request signal is output as the status of power supplied to the vehicle is changed from the power on status to the power off status.

6. The vehicle shift control system according to claim 1, wherein
the electronic control unit is configured to:
determine that the vehicle has entered a charging state at a given time; and
automatically control the lock indicator lamp to turn off, without user intervention, at a predetermined period after the given time.

7. The vehicle shift control system according to claim 1, wherein
the electronic control unit is configured to automatically control the lock indicator lamp to be either on or off, without user intervention, after a predetermined period of time has elapsed since the status of power supplied to the vehicle has changed.

8. The vehicle shift control system according to claim 1, wherein
the electronic control unit is configured to automatically control the lock indicator lamp to be either on or off, without user intervention, after a predetermined period of time has elapsed since an electrical storage device of the vehicle begins charging.

* * * * *